United States Patent
Miyaguchi

(10) Patent No.: US 12,490,930 B2
(45) Date of Patent: Dec. 9, 2025

(54) SWALLOWING SENSOR DEVICE AND METHODS OF MANUFACTURING THE SAME

(71) Applicant: TOHOKU UNIVERSITY, Sendai (JP)

(72) Inventor: Hiroshi Miyaguchi, Sendai (JP)

(73) Assignee: TOHOKU UNIVERSITY, Sendai (JP)

( * ) Notice: Subject to any disclaimer, the term of this patent is extended or adjusted under 35 U.S.C. 154(b) by 931 days.

(21) Appl. No.: 17/024,544

(22) Filed: Sep. 17, 2020

(65) Prior Publication Data

US 2021/0000408 A1  Jan. 7, 2021

Related U.S. Application Data

(63) Continuation of application No. PCT/JP2019/009974, filed on Mar. 12, 2019.

(30) Foreign Application Priority Data

Mar. 20, 2018  (JP) ................................. 2018-052757

(51) Int. Cl.
*A61B 5/00* (2006.01)
*A61B 5/07* (2006.01)
*A61B 5/01* (2006.01)

(52) U.S. Cl.
CPC ............ *A61B 5/4205* (2013.01); *A61B 5/073* (2013.01); *A61B 5/6861* (2013.01); *A61B 5/01* (2013.01); *A61B 2562/166* (2013.01)

(58) Field of Classification Search
CPC ..... A61B 1/041; A61B 5/01; A61B 2562/162; A61B 5/004; A61B 5/42–4205;
(Continued)

(56) References Cited

U.S. PATENT DOCUMENTS 9,913,387 B1  3/2018  Muttam et al.
2008/0081949 A1  4/2008  Gilad
(Continued)

FOREIGN PATENT DOCUMENTS

CN   204909364 U   12/2015
CN   106725259 A    5/2017
(Continued)

OTHER PUBLICATIONS

Translation of JP 2009-18078 (Year: 2020).*
(Continued)

*Primary Examiner* — Tse W Chen
*Assistant Examiner* — Alice Ling Zou
(74) *Attorney, Agent, or Firm* — Myers Wolin, LLC

(57) ABSTRACT

A swallowing sensor device includes a sensor unit comprising a sensor and a device that wirelessly transmits information detected by the sensor and a board group formed by stacking a plurality of rigid boards. The board group includes a fist rigid board on which one part of the sensor unit is mounted, a second rigid board on which other part of the sensor unit except for the one part of the sensor unit is mounted, and a third rigid board being disposed between the first rigid board and the second rigid board and comprising a through-hole drilled thereon, the through-hole being configured to electrically connecting the one part and the other part.

14 Claims, 12 Drawing Sheets

(58) Field of Classification Search
CPC ... A61B 5/4238; A61B 5/4255; A61B 5/4283; A61B 2560/0214; A61B 2562/166; A61B 5/0031; A61B 5/07–076; A61B 5/686–6861; A61B 2560/0406
See application file for complete search history.

(56) References Cited

U.S. PATENT DOCUMENTS

| | | | | |
|---|---|---|---|---|
| 2008/0284599 | A1* | 11/2008 | Zdeblick | G06K 7/10168 340/572.1 |
| 2009/0281381 | A1 | 11/2009 | Takenaka et al. | |
| 2009/0281401 | A1 | 11/2009 | Takenaka et al. | |
| 2010/0030025 | A1 | 2/2010 | Segawa et al. | |
| 2010/0076258 | A1 | 3/2010 | Segawa et al. | |
| 2012/0289775 | A1* | 11/2012 | Murata | A61B 5/6861 977/734 |
| 2013/0225923 | A1 | 8/2013 | Sakai et al. | |
| 2014/0180040 | A1* | 6/2014 | Fujimori | A61B 1/041 600/302 |
| 2018/0026680 | A1 | 1/2018 | Shirvani et al. | |
| 2018/0228396 | A1* | 8/2018 | Okubo | A61B 5/1473 |

FOREIGN PATENT DOCUMENTS

| | | | |
|---|---|---|---|
| EP | 2 116 177 A1 | 11/2009 | |
| EP | 2 116 184 A2 | 11/2009 | |
| JP | 2001-352141 A | 12/2001 | |
| JP | 2006-280940 A | 10/2006 | |
| JP | P2006-271520 A | 10/2006 | |
| JP | P2008-149114 A | 7/2008 | |
| JP | 2009-18078 A | 1/2009 | |
| JP | 2009-268692 A | 11/2009 | |
| JP | P2010-035636 A | 2/2010 | |
| JP | 2010-69209 A | 4/2010 | |
| WO | WO-2005046485 A1 * | 5/2005 | ......... A61B 10/0045 |
| WO | 2012/046502 A1 | 4/2012 | |

OTHER PUBLICATIONS

Translation of CN 106725259 (Year: 2023).*
S. Yoshida, H. Miyaguchi and T. Nakamura, "Development of Tablet-Shaped Ingestible Core-Body Thermometer Powered by Gastric Acid Battery," in IEEE Sensors Journal, vol. 18, No. 23, pp. 9755-9762, 1 Dec. 1, 2018, doi: 10.1109/JSEN.2018.2871064. (Year: 2018).*
S. Yoshida, H. Miyaguchi and T. Nakamura, "Development of basic system of ingestible core body thermometer with small size and low energy consumption powered by gastric acid battery," 2017 IEEE Sensors, Glasgow, UK, 2017, pp. 1-3, doi: 10.1109/ICSENS.2017.8234292. (Year: 2017).*
Notice of Reasons for Refusal issued by the Japan Patent Office for corresponding Japanese Patent Application No. 2020-508243, mailed on Nov. 10, 2020, with an English translation.
Notice of Reasons for Refusal issued by the Japan Patent Office for corresponding Japanese Patent Application No. 2020-508243, dated Mar. 2, 2021, with an English translation.
International Search Report issued by Japan Patent Office for corresponding patent application PCT/JP2019/009974, mailed on Jun. 18, 2019.
Shinya Yoshida et al, "Development of basic system of ingestible core body thermometer with small size and low energy consumption powered by gastric acid battery", Copyright 2017 IEEE, Tohoku University, Sendai Japan.
Extended European search report with the supplementary European search report and the European search opinion issued by the European Patent Office for corresponding European Patent Application No. 19771448.8-1126, dated Feb. 24, 2022.
Office Action issued by the Japan Patent Office for corresponding Japanese Patent Application No. 2021-112825, dated Sep. 14, 2021, with an English machine translation.
International Preliminary Report on Patentability issued by the International Bureau of WIPO for corresponding International Patent Application No. PCT/JP2019/009974, mailed on Oct. 1, 2020, with an English translation.

* cited by examiner

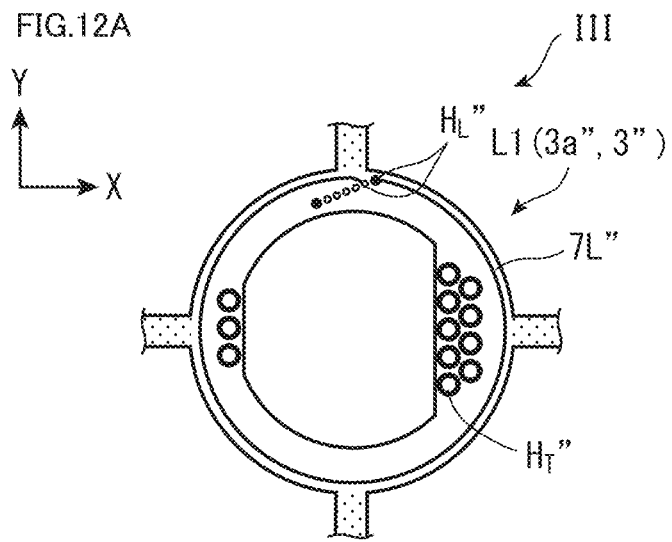
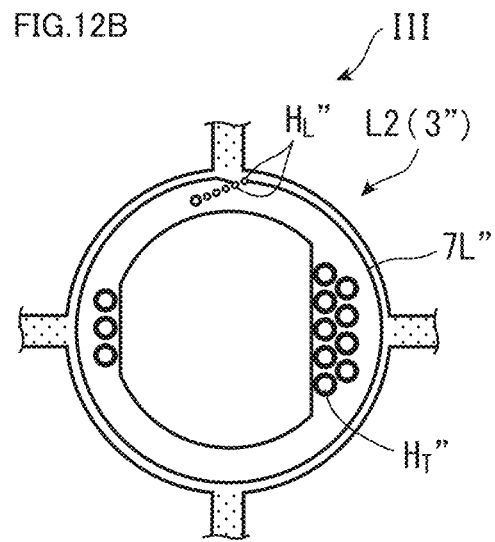
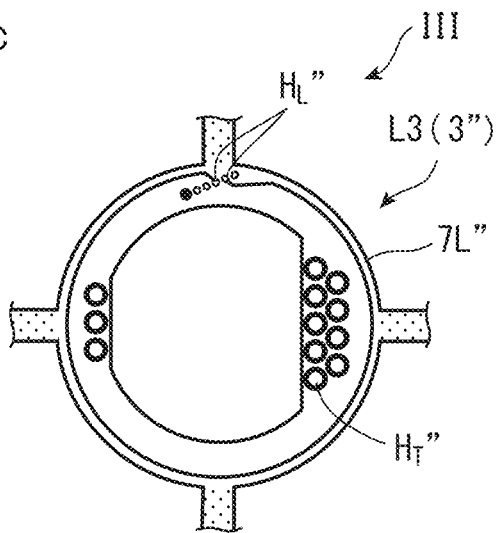
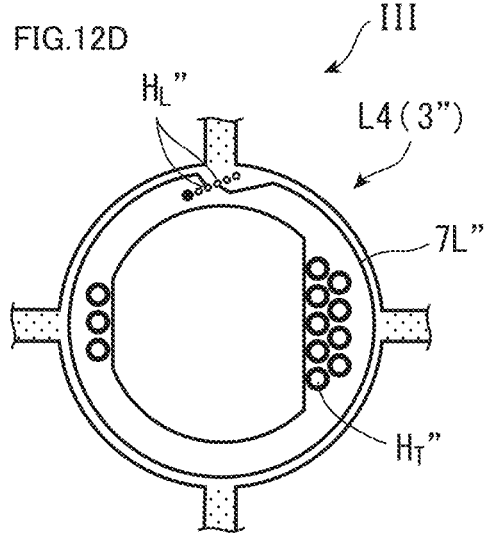
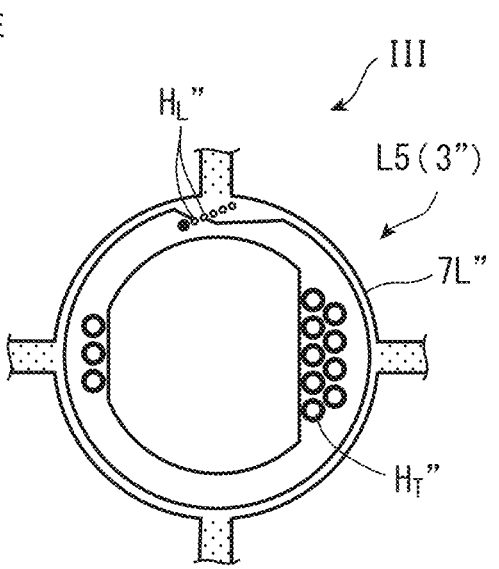
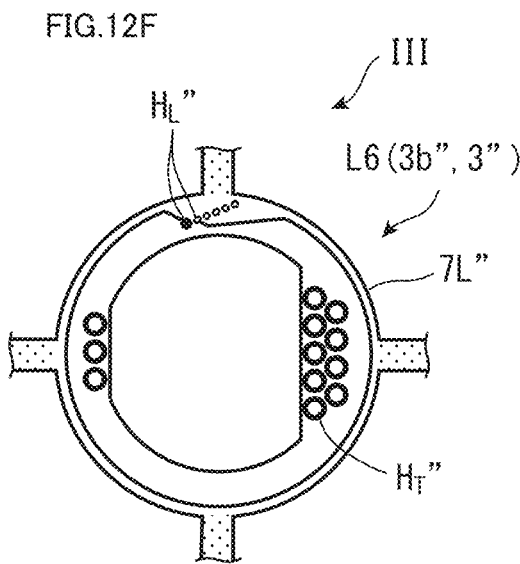

SWALLOWING SENSOR DEVICE AND METHODS OF MANUFACTURING THE SAME

CROSS-REFERENCE TO RELATED APPLICATION

This application is a continuation application of International Application PCT/JP2019/009974, filed on Mar. 12, 2019 and designated the U.S., which claims priority to Japanese Patent Application No. 2018-052757, filed on Mar. 20, 2018, the entire contents of each are incorporated herein by reference.

FIELD

The embodiments discussed herein are related to a swallowing sensor device and a method of manufacturing the same.

BACKGROUND

Conventionally, a sensor device with a sensor unit incorporated in a capsule has been known. Such a swallowing sensor device of a capsule type is swallowed by a subject and used to detect vital signs in the internal body.

The above sensor device incorporates therein sensor units exemplified by sensors such as a thermometer or a camera and additional devices relating to these sensors as well as a board in which the sensor units are mounted.

Such a sensor device incorporating various devices requires a shape and a compact-size that can be easily swallowed. To satisfy the above requirement, it has been proposed that the devices to be incorporated are distributedly arranged in multiple boards, rather than arranged in a single board. Furthermore, it has also been proposed to connect sensor units mounted on multiple rigid boards by one or more flexible boards.

For example, in a rigid-flexible board in which rigid boards provided with sensor units are connected by one or more flexible board, a sensor device in which the rigid boards are folded to be stacked by the flexible boards (see Patent Document 1).

LIST OF RELATED ART DOCUMENTS

[Patent Document 1] Japanese Laid-open Patent Publication No. 2006-271520

SUMMARY

Problems to be Solved

However, since a rigid-flexible board is generally more expensive than a rigid board, a sensor device using a rigid-flexible board as described above may increase the material cost. Further, since assembling of the sensor device requires bending by a flexible board, assembly cost may also rise. Not only to suppress the increase in costs caused by the use of such a flexible board, the swallowing sensor device is required to reduce the cost in the overall manufacturing process. Therefore, in order to suppress the manufacturing cost of the swallowing sensor device, there is room for improvement.

With the foregoing problems in view, the object of the present disclosure is to suppress the manufacturing cost of a swallowing sensor device. In addition to this object, an effect which is derived from each configuration of an embodiment to carry out the disclosure to be described below and which conventional technique does not attain is as another object of the present disclosure.

SUMMARY (1) The swallowing sensor device disclosed herein comprising: a sensor unit that includes a sensor and a device configured to wirelessly transmit information detected by the sensor; and a board group formed by stacking a plurality of rigid boards, wherein the board group includes a first rigid board on which one part of the sensor unit is mounted; a second rigid board on which other part of the sensor unit except for the one part of the sensor unit is mounted; and a third rigid board being disposed between the first rigid board and the second rigid board and comprising a through-hole drilled thereon, the through-hole being configured to electrically connect the one part and the other part of the sensor unit.

(2) The other swallowing sensor device disclosed herein comprising: a sensor unit that includes a sensor and a device configured to wirelessly transmit information detected by the sensor; and a board group formed by stacking a plurality of rigid boards, wherein the board group comprises one board on which one part of the sensor unit is mounted; another board on which other part of the sensor unit is mounted; and the one part mounted on the one board and the other part mounted on the another board are electrically connected in a direction of stacking the board group.

(3) The method of manufacturing a swallowing sensor device, the method comprising: stacking and electrically connecting.

In the stacking, stack a first rigid board on which one part of a sensor unit comprising a sensor and a device configured to wirelessly transmit information detected by the sensor is mounted, a second rigid board on which other part of the sensor unit except for the one part of the sensor unit is mounted, and a third rigid board comprising a through-hole drilled thereon for electrically connecting the one part and the other part such that the third rigid board is arranged between the first rigid board and the second rigid board.

In the electrically connecting, electrically connect the one part mounted on the first rigid board and the other part mounted on the second rigid board stacked in the stacking through the through-hole of the third rigid board. Effect According to the present disclosure, it is possible to electrically connect sensor units distributedly arranged in the first rigid board and the second rigid board through the through-holes of the third rigid board. This makes it possible to manufacture a swallowing sensor device without using a flexible board. Consequently, it is possible to suppress the manufacturing cost of the swallowing sensor device.

BRIEF DESCRIPTION OF THE DRAWINGS

FIG. 12A, FIG. 12B, FIG. 12C, FIG. 12D, FIG. 12E, and FIG. 12F are plan views shewing a third rigid board used in a swallowing sensor device of a third embodiment, FIG. 12A showing a first layer (front face) of the third rigid board, FIG. 12B showing a second layer of the third rigid board, FIG. 12C showing a third layer of the third rigid board, FIG. 12D showing a fourth layer of the third rigid board, FIG. 12E showing a fifth layer of the third rigid board, and FIG. 12F showing a sixth layer (back face) of the first rigid board;

DESCRIPTION OF EMBODIMENTS

Figure 1:
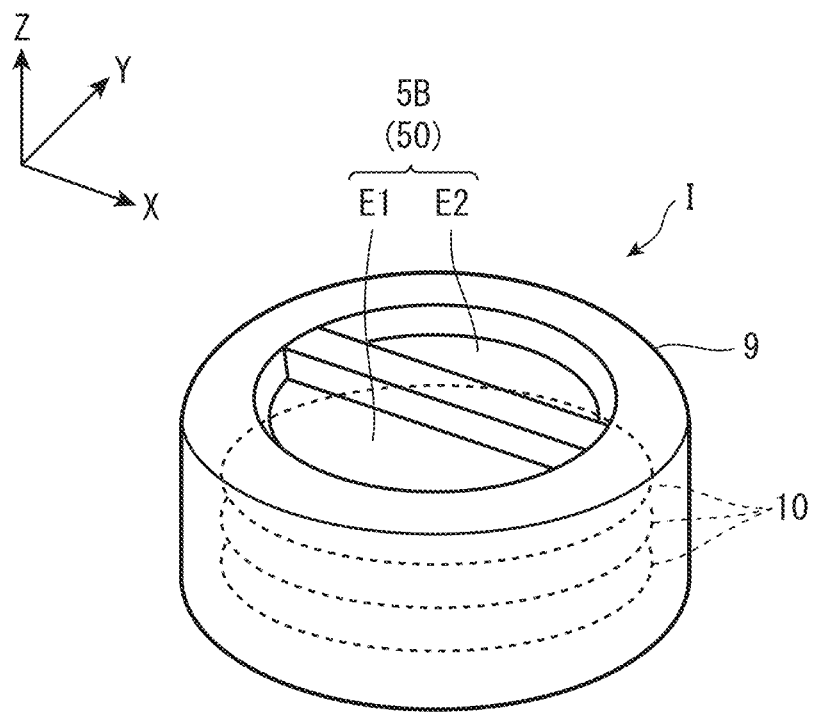
FIG. 1 is a perspective view showing an external appearance of a swallowing sensor device of a first embodiment.

Hereinafter, description will now be made in relation to an embodiment for carrying out a swallowing sensor device (hereinafter abbreviated as a "sensor device").

The sensor device of the present embodiment is formed by incorporating boards being stacked on which sensor units are mounted.

Here, a sensor device which is swallowed and used by a subject is exemplified. An example to the target to be detected by the sensor device is the vital sign of the subject. An example of the vital signs is the internal temperature (hereinafter referred to as "deep body temperature") of the subject at rest.

In the drawings to be referenced in the following description, the positive-oriented orthogonal coordinate system having the X axis, the Y axis, and Z axis is defined as the reference of the orientation, and the sensor device shall be in a predetermined orientation. The sensor device in a predetermined orientation is assumed that the boards extend along both the X-axis and Y-axis, and the stacking direction of the boards is along the Z direction.

Incidentally, illustration of connection lines between devices in a plan view and the perspective views is omitted, for convenience. Further, in the cross-sectional views and the schematic views, the thicknesses of sensor units are exaggerated and some devices which arc not arranged on the same cross-section but are arranged on the same plane appear.

Hereinafter, sensor devices according to a first embodiment, a second embodiment, a third embodiment, a fourth embodiment, and a fifth embodiment will be sequentially detailed. The embodiments to be detailed merely illustrative and are not intended to exclude the application of various modifications and techniques not explicitly described in the embodiment.

I. First Embodiment

[1. Configuration]

First, referring to FIGS. 1 and 3, an overview of a sensor device I will now be described.

The sensor device I is provided with a capsule 9 that incorporates therein a board group 10 and a sensor unit 50. The capsule 9 forms the outer shell of the sensor device I. This capsule 9 is made of material which is hardly dissolved by digestive juice such as the gastric juice and the intestinal juice.

The sensor device I is formed into a shape easy to swallow. Here, a sensor device I having an approximate shape in which the upper and lower bottoms of the cylinder bulge. However, various shapes, such as truncated, spherical, and disk-shaped, may be applied to the sensor device I. Incidentally, the censor device I illustrated here is almost covered by the capsule 9, but part of the sensor unit 50 are exposed.

Hereinafter, the basic circuit configuration of the sensor device I will be described, followed by a detailed description of the specific layout configuration.

[1.1. Circuit Configuration]

Figure 2:
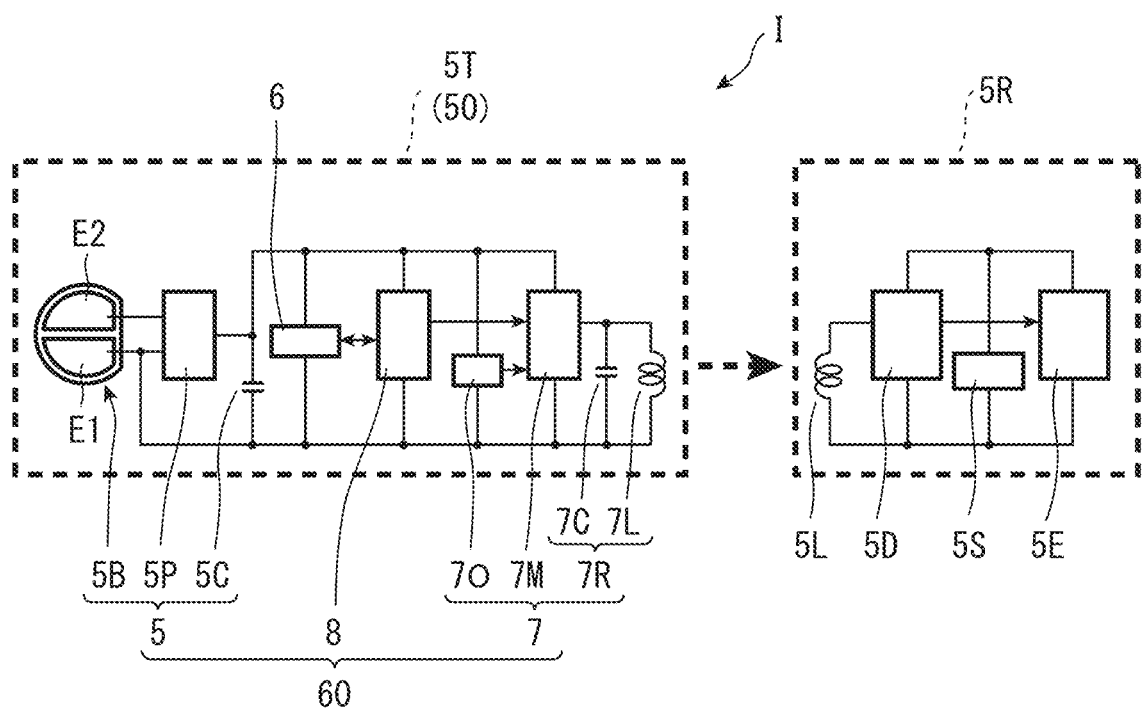
FIG. 2 is a schematic circuit diagram showing a sensor unit incorporated in a swallowing sensor device of the first embodiment.

As shown in FIG. 2, the sensor unit 50 incorporated in sensor device I constitutes a circuit (hereinafter abbreviated as "transmitter circuit") 5T for transmitting the detected information to the outside.

The transmitter circuit 5T is provided with a sensor C that detects the temperature, and a device 60 that wirelessly transmits information detected by the sensor 6. The device 60 includes a transmitter 7 that transmits (outputs) information to the outside, a power source unit 5 that supplies electric power, and a controller 3 that controls, for example, the sensor 6 and transmitter 7.

In addition, information transmitted from sensor device I are received by a receiver circuit 5R provided outside the body of the subject who swallowed the sensor device I.

The receiver circuit 5R is provided with a coil (hereinafter abbreviated as "receiving coil") 5L for receiving information transmitted from the sensor device I, a demodulator 5D, and a power source unit 5S that supplies electric power to demodulator 5D. This receiver circuit 5R is also provided with a display 5E that displays the received information.

—Transmitter Circuit—
<Power Source Unit>

The power source unit 5 is provided with a battery 5B, which is a supplying source of electric power. In addition to the battery 5B, the power source unit 5 also includes a booster circuit 5P that boosts the voltage of the battery 5B and supplies the boosted voltage, and an electric power source capacitor 5C.

Here, a gastric acid battery, which generates electric power between two electrodes E1 and E2 when being brought into contact with gastric acid (an acidic fluid) as a battery 5B. Alternatively, a battery 5B may be used which generates electric power between the two electrodes E1 and E2 when being brought into contact with another body fluid, such as intestinal fluid as well as gastric acid.

For the electrodes E1 and E2, a magnesium (Mg) thin film is used for one electrode, i.e., the negative electrode E1 (first electrode) and a gold (Au) thin film is used for the other electrode, i.e., the positive electrode E2 (second electrode).

As an alternative to the above gastric acid battery, various power supplying source ouch as a module that wirelessly supplies electric power or a button battery may be used as the battery 5B.

The electrodes E1 and E2 are connected to the following booster circuit 5P.

The booster circuit 5P is a functional circuit that boosts the input voltage between the electrodes E1, E2, and outputs the boosted voltage. For example, the booster circuit 5P, when a voltage of about 1.0 [V] is input from the electrodes E1 and E2, outputs a voltage of about 3.0 [V].

An power source capacitor 5C to be described next is connected to the output side of this booster circuit 5P.

The power source capacitor 5C exerts a function of smoothing the current or voltage. In addition, the power source capacitor 5C also exerts a function of retaining charged charges like a storage battery. Here, as the power source capacitor 5C, a Multi-Layer Ceramic Capacitor (MLCC) having an electric capacitance of 220 [μF] is used.

The sensor 6, the transmitter 7, and the controller 8 are connected in parallel to the above power source capacitor 5C, and power is supplied to each of the sensor 6, the transmitter 7, and the controller 8.

<Sensor>

The sensor 6 is a temperature sensor that detects the temperature. That is, the sensor 6 constitutes a part (temperature measuring unit) that measures the temperature in the sensor device I. Here, among the general-purpose digital-temperature sensors, one small in size and low in power consumption is used as the sensor 6.

The information detected in this sensor 6 is input into the controller 8.

<Transmitter>

The transmitter 7 is provided with an oscillator 7O that generates a carrier wave, a modulator 7M that outputs a modulated wave obtained by modifying the carrier wave generated by the oscillator 7O and superimposing information detected by the sensor 6 on the modified carrier wave, and a resonant circuit 7R that outputs the modulated wave from the modulator 7M to the outside. Here, the resonant circuit 7R in which the transmitter capacitor 7C and the transmitting coil 7L (coil) are connected is used.

That is, the carrier wave from the oscillator 7O is modulated by the modulator 7M to generate a modulated wave containing a signal of the detected temperature obtained by the sensor 6. This modulated wave is outputted in the form of an electromagnetic wave from the resonant circuit 7R.

The above-described electromagnetic wave communication requires both the transmissiveness through the living body such as the digestive tract and the other body of the subject that swallowed the sensor device I and the energy lose suppression. Generally, electromagnetic wave has a first characteristic that the bioabsorption loss increases in the frequency region higher than 100 [MHz], and a second characteristic that, when the transmitting coil 7L is small in size, the transmission efficiency lowers as the frequency is lower. Therefore, the frequency of the electromagnetic wave to be output is preferably selected, considering the first characteristic and the second characteristic described above.

Here, a carrier wave of 13.56 [MHz] is employed. Manchester coding is also used as the coding scheme, and the binary phase shift keying (BPSK) is used as the modulation scheme.

According to the above setting, a single transmission requires the time of about 1 [ms] and the power consumption of about 3 [μJ].

<Controller>

The controller 8 is connected to the sensor 6 and the modulator 7M. This controller 8 carries out the various controls 1-3 listed below.

Control 1: detection by the sensor 6

Control 2: encapsulation of information detected by the sensor 6

Control 3: setting the outputting frequency from the resonant circuit 7R

Control 1 is an actuation control that activates the sensor 6 to detect the temperature.

Control 2 is a signal control that generates information to be superimposed on the carrier wave through encapsulation of information.

Control 3 is an actuation control that resonates, via the modulator 7M, the resonant circuit 7R.

In addition to the above, the controller 8 may be connected to the oscillator 7O. Further, the controller 8 may be involved in power source control that switches the ON/OFF of power source of at least one of the sensor 6, the oscillator 7O, and the modulator 7M.

—Receiver Circuit—

In the receiver circuit 5R, the electromagnetic wave from the transmitter circuit 5T described above is received at the receiving coil 5L. The electromagnetic wave received at the receiving coil 5L is demodulated by the demodulator 5D so that information (i.e., information of "deep body temperature") detected by the sensor 6 is extracted. The receiving coil 5L and the demodulator 5D are supplied with the electric power from the power source unit 5S. In this receiver circuit 5R, the information of the deep body temperature extracted by the demodulator 5D is displayed on the display 5E, and the electric power from the power source unit 5S is also supplied to the display 5E.

Incidentally, the information of the deep body temperature extracted by the demodulator 5D is not limited to being displayed on the display 5E and may alternatively be stored into an on-line storage through a non-illustrated communication network. In this case, the on-line storage can be configured such that the data therein can be browsed from electronic devices, such as a smartphone or a notebook computer, that can be connected to the above communication network.

Furthermore, suggestions and warnings regarding health conditions can also be informed the subject and the person concerned based on a database of vital signs containing information on the deep body temperature accumulated in the on-line storage. In addition, the sensor device I can be controlled according to the demands from the electronic equipment of the subject and the person concerned. Thus, it is also possible to use the sensor device I by utilizing the so-called big data or IoT (Internet of Things).

[1.2. Layout Configuration]

Next, the layout configuration of the sensor device I will now be described in detail with reference to FIGS. 3-6.

Figure 3:
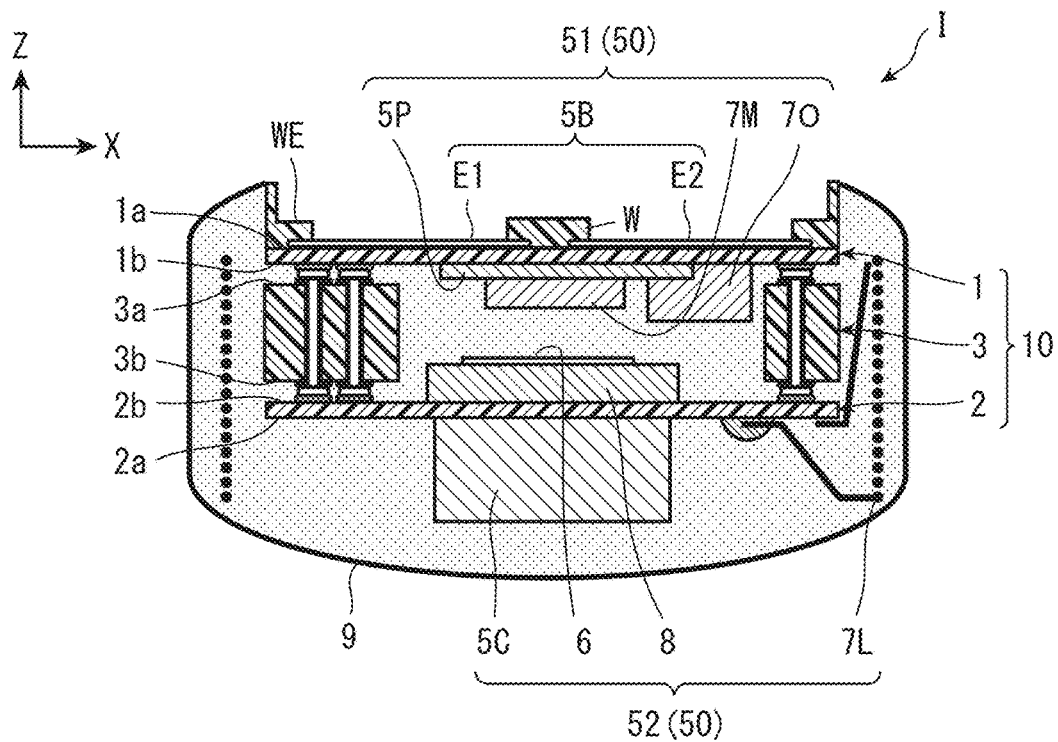
FIG. 3 is a schematic diagram illustrating a main part of a swallowing sensor device of the first embodiment.

As shown in FIG. 3, in the sensor device I, in addition to the sensor unit 50 constituting the transmitter circuit 5T described above, a board group 10 in which sensor unit 50 are distributedly arranged is incorporated in the capsule 9. In the sensor device I, the part inside the capsule 9 except for the sensor unit 50 and the board group 10 is filled with resin (indicated by halftone dots) As this resin, resin adaptable to a living body (hereinafter, referred to as "bioadaptable resin") is applied.

The board group 10 consists of three rigid boards 1, 2 and 3 stacked along the Z-axis. As these rigid boards 1, 2, and 3, there are provided a first rigid board 1 disposed on the upper side in FIG. 3, a second rigid board 2 disposed on the lower side in FIG. 3, and a third rigid board 3 disposed between the rigid boards 1 and 2.

Further, these rigid board 1, 2, and 3 each uses a double-sided board of which the front and back sides can be wired. In regard of the first rigid board 1, the top face in FIG. 3 is defined as a "front face 1a (first face)" and the lower face is defined as a "back face 1b (second face)". Similarly, in regard of the third rigid board 3, the top face in FIG. 3 is defined as a "front face 3a (first face)" and the lower face is defined as a "back face 3b (second face)". In contrast, in regard of the second rigid board 2, the lower face in FIG. 3 is defined as "front face 2a (first face)" and top face is defined as "back face 2b (second face)".

Figure 5A:
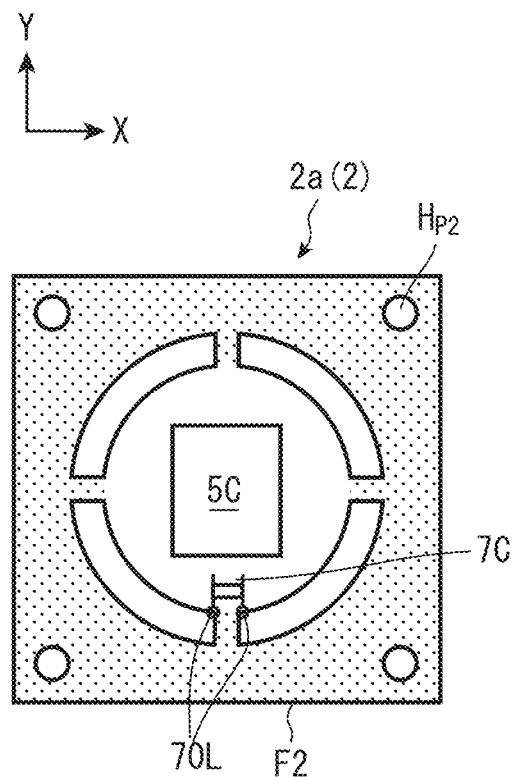
FIG. 5A and FIG. 5B are plan views showing a second rigid board used in a swallowing sensor device of the first embodiment, FIG. 5A showing a front face of the second rigid board, and FIG. 5B showing a back face of the second rigid board.
Figure 5B:
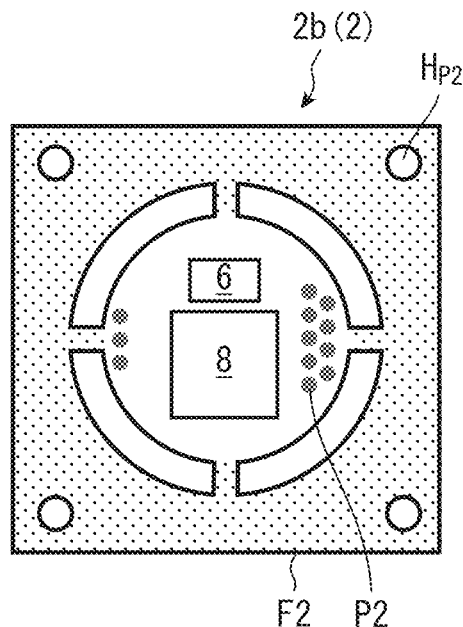
Figure 6:
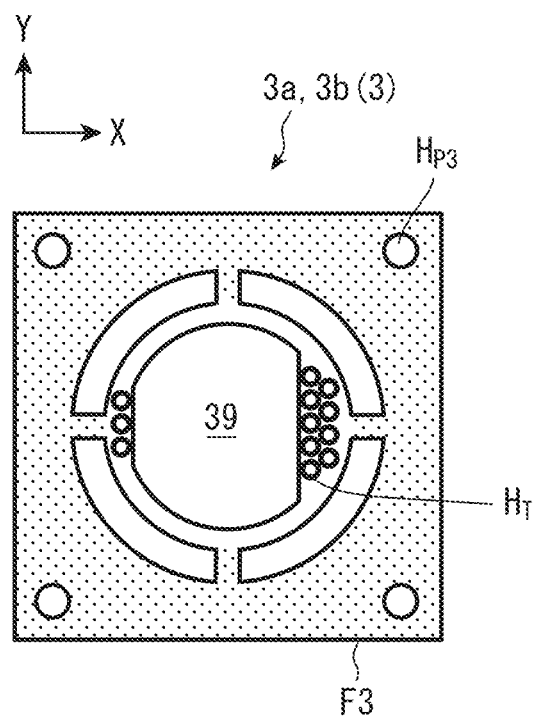
FIG. 6 is a plan view illustrating a third rigid board used in a swallowing sensor device of the first embodiment.

As shown in FIGS. 4-6, each of the rigid boards 1, 2, and 3 is a portion cut out circularly from rectangular frames F1, F2, and F3, respectively (in FIGS. 4 to 6, the portions to be discarded are indicated by halftone dots).

The frames F1, F2, and F3 are the base material of the rigid boards 1, 2, and 3, respectively. These frames F1, F2, and F3 are set to have the same shape and the same area in a plan view (in the Z-axis view). The rigid boards 1, 2, and 3 are also set to have the same shape and the same area in a plan view.

Incidentally, the shape of rigid boards 1, 2, and 3 preferably corresponds to the shape of the capsule 9 (approximate shape of sensor device I), and the shape are not limited to a circular and alternatively may be various shapes such as an ellipse or a polygon. The shapes of the frames F1, F2, and F3 are not particularly limited.

Further, on portions of the frames F1, F2, and F3 that are to be discarded apart from the prospective rigid boards 1, 2, and 3, holes (hereinafter referred to as "positioning hole") $H_{P1}$, $H_{P2}$, and $H_{P3}$ for positioning when stacking the rigid boards 1, 2, and 3 are drilled. Here, the positioning holes $H_{P1}$, $H_{P2}$, and $H_{P3}$ provided to the four corners of the respective frames F1, F2, and F3 are exemplified (the reference symbol is attached to only one of the four holes).

These positioning holes $H_{P1}$, $H_{P2}$, and $H_{P3}$ are arranged at positions that coincide with one another in a plan view when the rigid beards 1, 2, and 3 or the frames F1, F2, are F3 are stacked so as to coincide with each other in a plan view.

Therefore, by just stacking rigid board 1, 2, and 3 by inserting pins P extending in the Z-axis direction through the positioning holes $H_{P1}$, $H_{P2}$, $H_{P3}$ (see FIG. 7), it is possible to determine the positions of the rigid boards 1, 2, and 3 in the XY plane.

On the present embodiment, one part (hereinafter referred to as "first sensor unit") 51 of the sensor unit 50 is disposed on the first rigid board 1. On the second rigid board 2, the other part (hereinafter referred to as "second sensor unit") 52 excluding the first sensor unit 51 from the sensor unit 50 is disposed. In this example, no sensor unit 50 is disposed on the third rigid board 3.

Hereinafter, each of rigid board 1, 2, and 3 will be detailed.

—First Rigid Board—

Figure 4A:
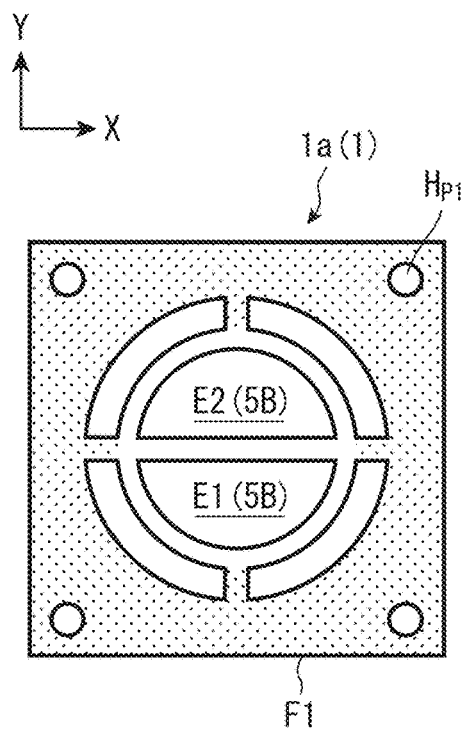
FIG. 4A and FIG. 4B are plan views showing a first rigid board used in a swallowing sensor device of the first embodiment, FIG. 4A showing a front face of the first rigid board, and FIG. 4B showing a back face of the first rigid board.

As shown in FIG. 4A, the front face 1a of the first rigid board 1 is mounted with the negative electrode E1 and the positive electrode E2 of the battery 5B.

These electrodes E1 and E2 are, as shown in FIG. 3, arranged such that the top faces thereof are exposed to the outside and are to be immersed directly in the gastric juice. Incidentally, the electrodes E1 and E2 are aligned along the Y direction as shown in FIG. 4A, but, for convenience of illustration, appear to align along the X direction in FIG. 3.

Here, a partition wall W is extended between the electrodes E1 and E2. This partition wall W prevents the subject's stomach wall (the inner wall of the digestive system) from contacting both the electrodes E1 and E2, and prevents thermal injury (so-called burns) of the stomach wall due to a possible short circuit of the electrodes E1 and E2.

Incidentally, the electrodes E1 and E2 are formed by a sputtering method on the front face 1a of the first rigid board 1 manufactured by a microfabrication technique (MEMS (Micro Electro Mechanical Systems) technique).

Figure 4B:
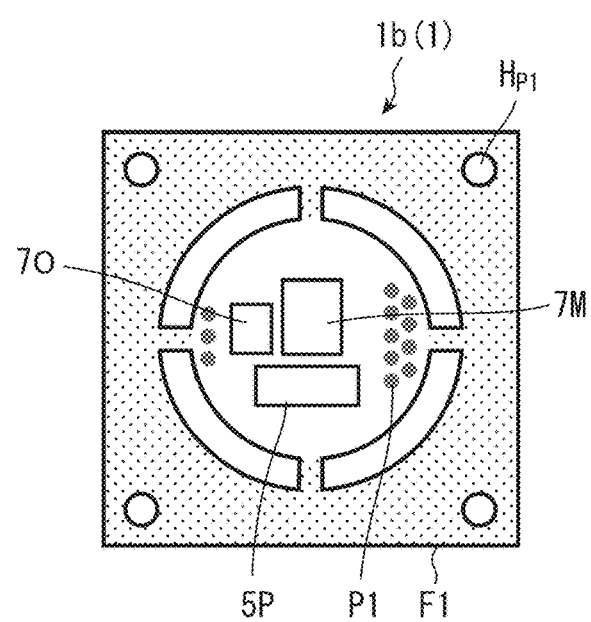

The back face 1b of the first rigid board 1 of FIG. 4B is implemented with the booster circuit 5P, the oscillator 7O and the modulator 7M.

The above battery 5B, the booster circuit 5P, the oscillator 7O, and the modulator 7M serve as the first sensor unit 51.

Furthermore, the back face 1b of the first rigid board 1 is provided with multiple pads P1 (also referred to as "lands", only one of which is indicated by a reference symbol), for connection (electrical connection) with the second sensor unit 52 mounted on the second rigid board 2. Furthermore, the modulator 7M is connected to any one of the pads P1.

—Rigid Board 2—

As shown in FIG. 5A, the front face 2a of the second rigid board 2 is mounted with the power source capacitor 5C and is further provided with the connecting terminal 70L and the transmitter capacitor 7C of the transmitting coil 7L (see FIG. 3). The positions at which the transmitting coil 7L and the transmitter capacitor 7C are arranged are not limited to the front face 2a of the second rigid board 2, and may alternatively be the front face 1a or the back face 1b of the first rigid board 1, or the back face 2b of the second rigid board 2. As shown in FIG. 5B, back face 2b of the second rigid board 2 is mounted with the sensor C and the controller 3. Further, as shown in FIG. 3, the transmitting coil 7L is attached to the front face 2a of the second rigid board 2 on which the second sensor unit 52 is already implemented and is externally attached to the board group 10. For example, the transmitting coil 7L is connected to the front face 2a of the second rigid board 2 with solder paste.

The above power source capacitor 5C, the sensor 6, the controller 8, the transmitting coil 7L, and transmitter capacitor 7C serves as the second sensor unit 52.

Furthermore, as shown in FIG. 5B, the back face 2b of the second rigid board 2 is provided with pads P2 (one of which is indicated by a reference symbol) at positions coincide with the pad P1 on the back face 1b of the first rigid board 1 in a plan view. Further, the signal of the modulated wave outputted from the modulator 7M of the first rigid board 1 is output to the transmitter capacitor 7C through a connecting terminal 70L of the transmitting coil 7L connected to the pad P2 corresponding to the pad P1 to which the modulator 7M is connected.

—Rigid Board III—

As shown in FIG. 6, on the third rigid board 3, through-holes $H_T$ (one of which is indicated by a reference symbol) are drilled for electric connection between the first sensor unit 51 and the second sensor unit 52. Incidentally, the front face 3a and the back face 3b of the third rigid board 3 are configured the same as each other.

The through-holes $H_T$ are arranged at positions corresponding to the above-mentioned pads P1 and P2 in a plan view. The inner faces of these through-holes $H_T$ formed by drilling the third rigid board 3 are plated with conductor such as solder or copper. The conductor of the through-hole $H_T$ is electrically connected to the above pads P1, P2 with known materials such as Anisotropic Conductive Films (ACFs) having conductivity in the Z direction or solder.

Alternatively, the pads P1 on the back face 1b of the first rigid board 1 and the pads P2 on the back face 2b of the second rigid board 2 may be provided at offset positions in a plan view and may be electrically connected via wiring by the third rigid board 3.

In order to avoid interfering with the booster circuit 5P, the oscillator 7O, the modulator 7M, the sensor 6, and the controller 8 mounted on the back faces 1b and 2b of the other rigid boards 1 and 2, this third rigid board 3 is provided with a portion (hereinafter referred to as "punched portion") 39 removed by punching. That is, the third rigid board 3 is formed into an annular shape. The multiple through-holes $H_T$ exemplarily illustrated in FIG. 6 are arranged on one side and the other side interposed by the punched portion 39. Alternatively, multiple through-holes $H_T$ may be arranged around the punched portion 39.

[2. Method of Manufacturing Sensor Device]

Next, a method of manufacturing the above sensor device I will now be described.

In the method of manufacturing exemplified here, three steps of a preprocessing step A, an intermediate processing step B, a postprocessing step C are carried out in this sequence.

Figure 7A:
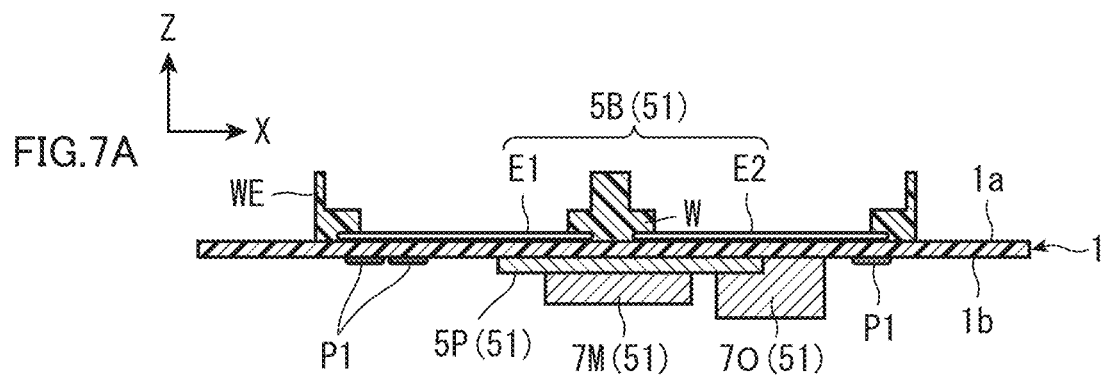
FIG. 7A, FIG. 7B, FIG. 7C, and FIG. 7D are diagrams showing a preprocessing step of a method of manufacturing a swallowing sensor device of the first embodiment, FIG. 7A showing a first implementing step, FIG. 7B showing a second implementing step, FIG. 7C showing a stacking step, and FIG. 7D showing an electrically connecting step.
Figure 7B:
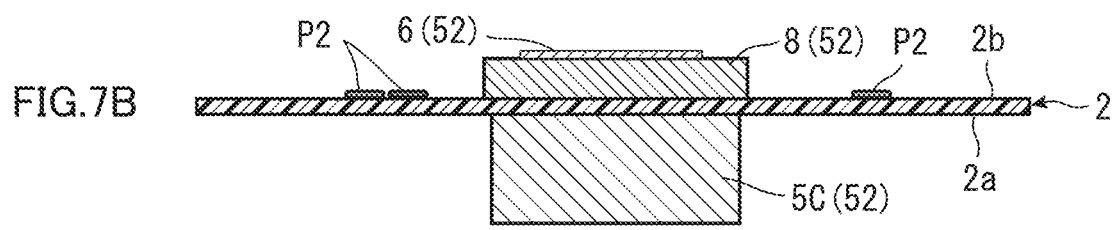
Figure 7C:
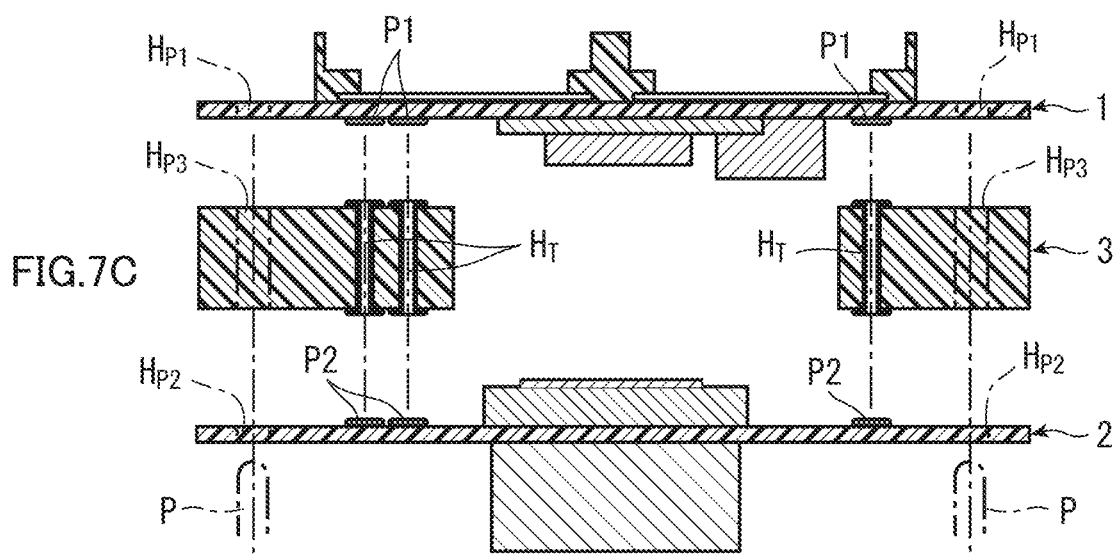
Figure 7D:
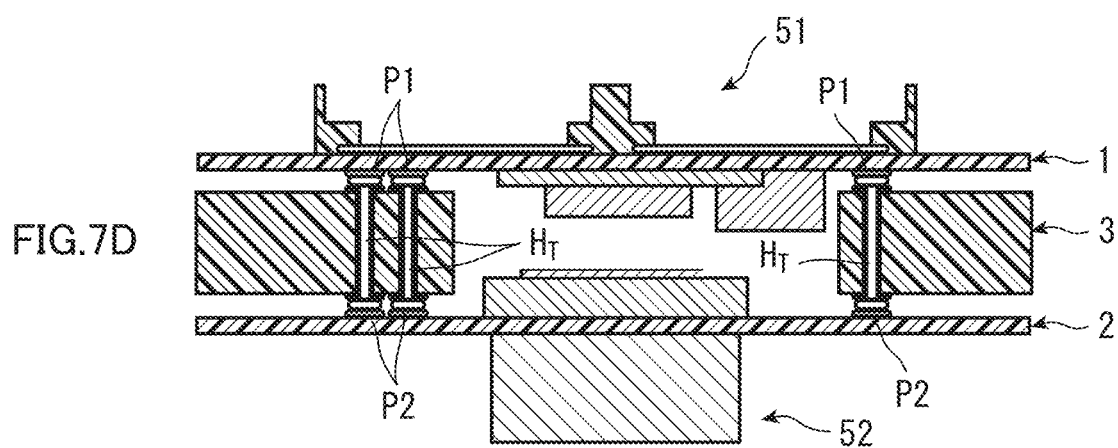

In the preprocessing step A, the following Steps A1-A4 are performed sequentially, as shown in FIG. 7 to FIG. 7D.

Step A1: a first implementing step of mounting the first sensor unit 51 on the first rigid board 1

Step A2: a second implementing step of mounting the second sensor unit 52 on the second rigid board 2

Step A3: a stacking step of stacking the rigid boards 1, 2, and 3

Figure 8A:
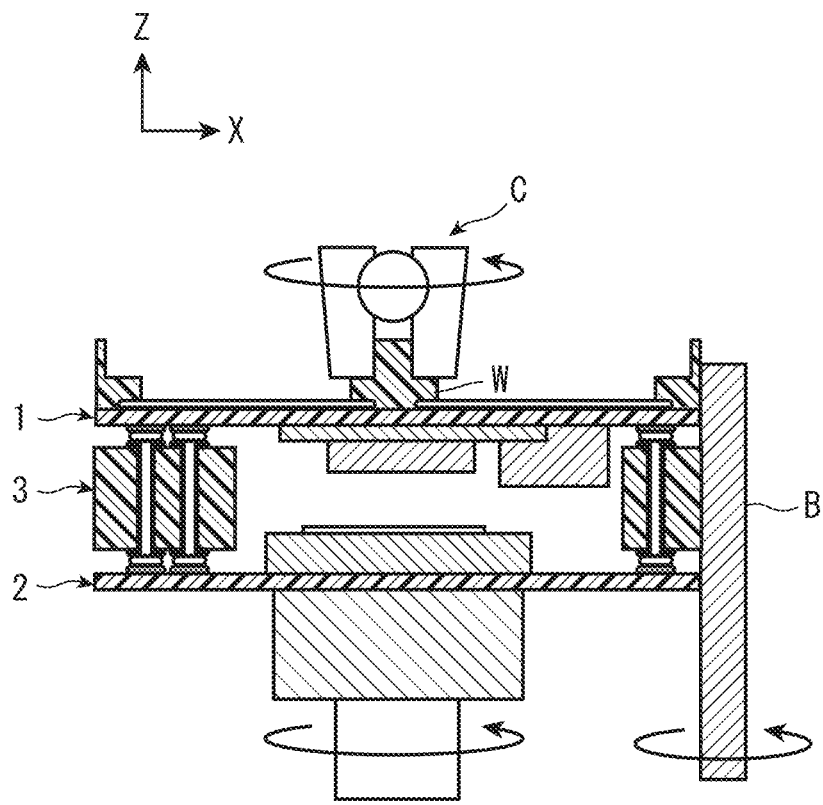
FIG. 8A and FIG. 8B are diagrams showing an intermediate processing step of a method of manufacturing a swallowing sensor device of the first embodiment, FIG. 8A showing a trimming step, and FIG. 8B showing a third implementing step.
Figure 8B:
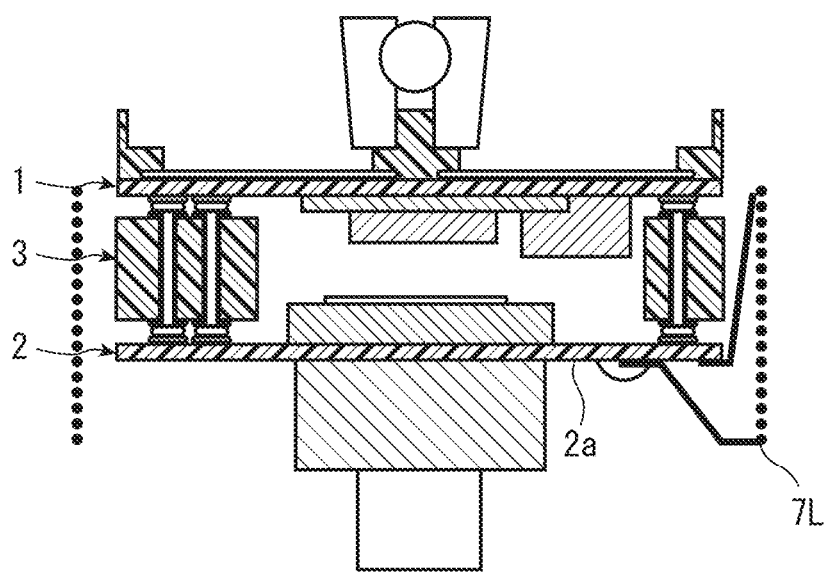

Step A4: electrically connecting step of electrically connecting the sensor units 51, 52 with the through-holes $H_T$ As shown in FIG. 8A and FIG. 8B, in the intermediate processing step B, following Steps B1 and B2 are carried out sequentially.

Step B1: a trimming step of shaping the rigid boards 1, 2, and 3

Figure 9A:
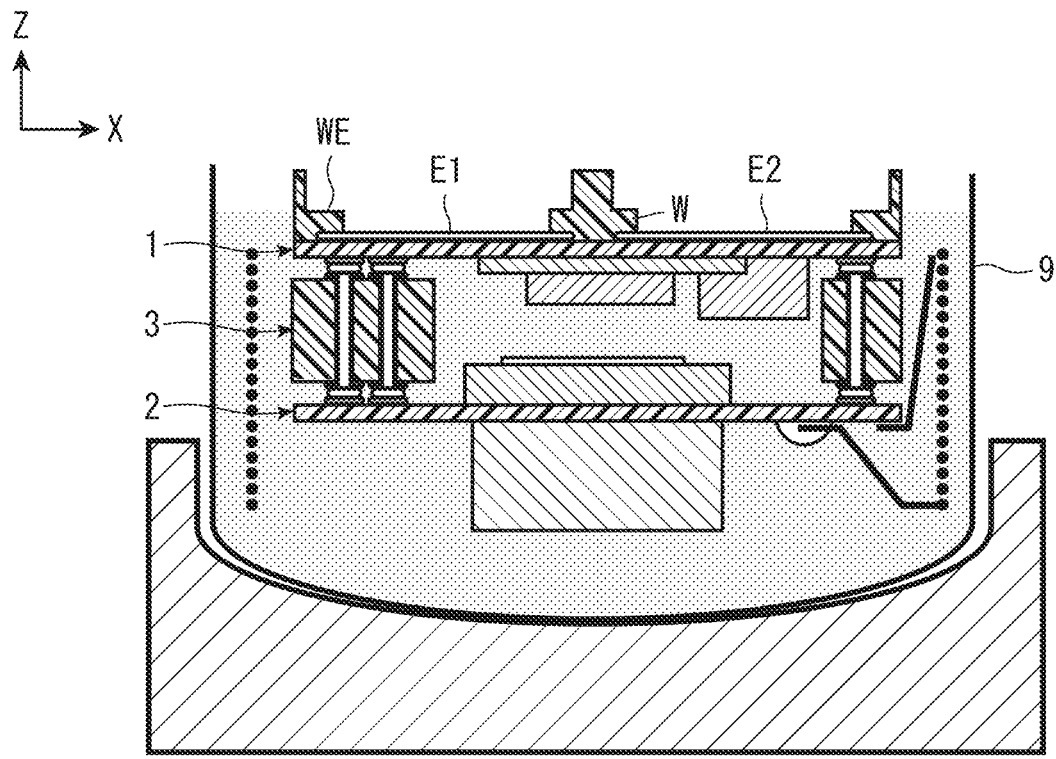
FIG. 9A and FIG. 9B are diagrams illustrating an postprocessing step of a method of manufacturing a swallowing sensor device of the first embodiment, FIG. 9A showing an immersing and curing step, and FIG. 9B shewing a shaping step.
Figure 9B:
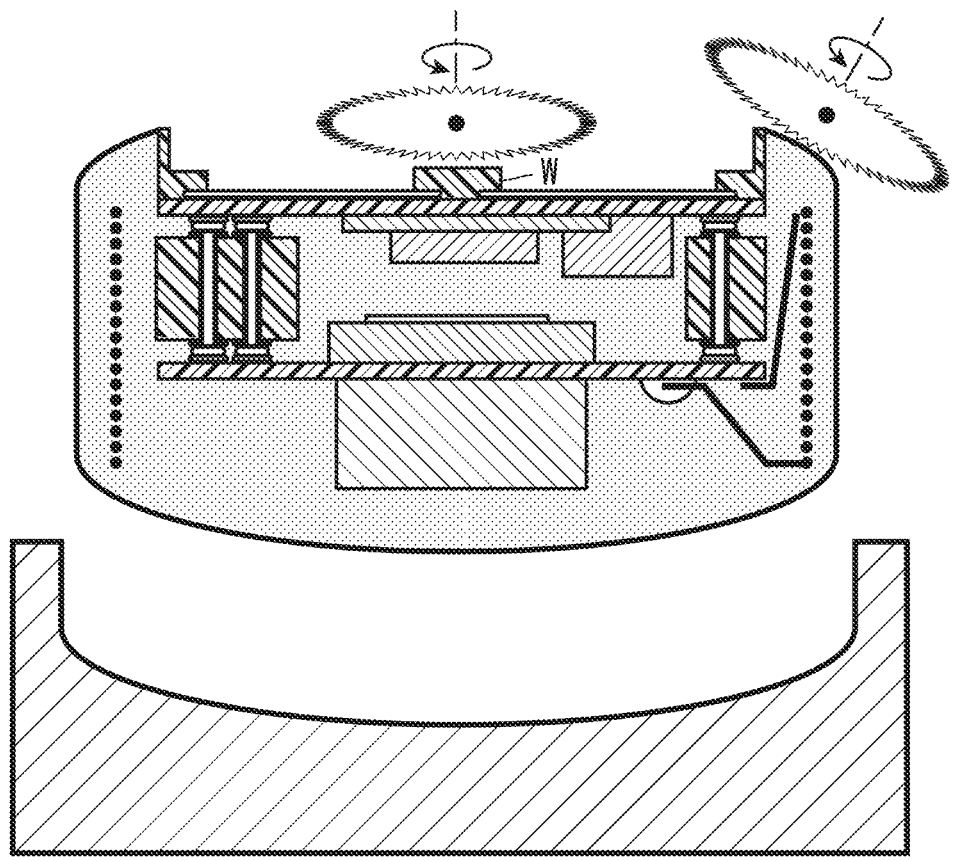

Step B2: a third implementing step of completing an internal module by externally attaching the transmitting coil 7L In the postprocessing step C, the following Steps C1 and C2 are carried out sequentially, as shown in FIG. 9A and FIG. 9B.

Step C1: an immersing and curing step of curing an internal module by immersing the module in resin Step C2: a shaping step of adjusting the outer shape —Preprocessing Step—

<First Implementing Step>

In the first implementing step of Step A1, as shown in FIG. 7A, the electrodes E1 and E2 of the battery 5B are mounted on the front face 1a of the first rigid board 1, and also the booster circuit 5P, the oscillator 7O, and the modulator 7M are mounted on the back face 1b. This back face 1b is provided with the pads P1. Furthermore, with respect to front face 1a, a partition wall W between the electrodes E1 and E2 and an external wall WE surrounding the electrodes E1 and E2 are formed.

<Second Implementing Step>

In the second implementing step of Step A2, as shown in FIG. 7B, a second sensor unit 52 except for the transmitting coil 7L are mounted. Specifically, the power source capacitor 5C and the transmitter capacitor 7C are mounted on the front face 2a of the second rigid board 2, and the sensor 6 and the controller 8 are mounted on the back face 2b. This back face 2b is provided with the pads P2.

<Stacking Step>

In the stacking step of Step A3, as shown in FIG. 7C, the third rigid board 3 is disposed between the first rigid board 1 and the second rigid board 2 to stack these boards 1, 2, and 3. Specifically, into the above-described positioning holes $H_{P1}$, $H_{P2}$, and $H_{P3}$ (indicated by a dashed line), a pin P (indicated by a dashed line) extending in the Z-axis direction is inserted to stack, the rigid board 1, 2, and 3. Thus, the positioned rigid board 1, 2, and 3 of the respective positions in the XY plane are stacked.

<Electrically Connecting Step>

In the electrically connecting step of Step A4, the pads P1, P2 and through-hole $H_T$ are electrically connected as shown in the FIG. 7D. Specifically, the pads P1, P2, and through-hole $H_T$ are bonded by known materials such as anisotropic conductive films and solder. Thus, the sensor units 51 and 52 are electrically connected through through-hole $H_T$. Further, an adhesive may be poured between the first rigid board 1 and the third rigid board 3 and between the second rigid board 2 and the third rigid board 3 to increase the bonding strength between the boards.

—Intermediate Processing Step—

<Trimming Step>

In the trimming step of Step B1, as shown in FIG. 8A, the base material part except for the rigid boards 1, 2, and 3 are removed for shaping. Specifically, the pins P are removed from the positioning holes $H_{P1}$, $H_{P2}$, and $H_{P3}$ described in the above stacking step, and the upper portion of the partition wall W at the rigid boards 1, 2, and 3 is rotated, being grasped by a clamp C, so that the base material part at a portion except for the rigid board 1, 2, and 3 is cut off by a trimming bit B. Alternatively, the base material part at a portion except for the rigid board 1, 2, and 3 may foe cut off by moving the trimming bit B around the rigid boards 1, 2, and 3 while the upper portion of the partition wall W is grasped by the clamp C at the rigid boards 1, 2, and 3 without removing the pins P from positioning holes $H_{P1}$, $H_{P2}$, and $H_{P3}$ described above in the above stacking step.

<Third Implementing Step>

In the third implementing step of Step B2, as shown in FIG. 8B, the transmitting coil 7L is mounted on the front face 2a of the second rigid board 2. Specifically, the transmitting coil 7L is connected by melting the cream solder of front face 2a of the second rigid board 2.

—Postprocessing Step—

<Immersing and Curing Step>

In the immersing and curing step of Step C1, as shown in FIG. 9A, an internal module consisting of the rigid boards 1, 2, and 3 and the sensor unit 50 described above is immersed in the bioadaptable resin filled inside the capsule 9. At this time, the internal module is held at a position where the bioadaptable resin does not overcome the external wall WE so that the electrodes E1 and E2 are not immersed in the bioadaptable resin. Then, the bioadaptable resin is cured. Alternatively, the process waits until the bioadaptable resin cures. A hole may be provided in rigid board 1 and 2, so that the punched portion 39 in the third rigid board 3 is easily filled with the bioadaptable resin.

<Shaping Step>

In the shaping step of the Step C2, the outer shape is adjusted as shown in FIG. 9B. Specifically, the outer shape is adjusted by rounding the corners or cutting off the upper portion of the partition wall w grasped by the clamp C.

[3. Action and Effect]

The sensor device I of the present embodiment, which is configured as described above, brings the following actions and effects.

In the sensor device I, the sensor unit 50 are distributedly mounted on the board group 10 consisting only of the rigid boards 1, 2, and 3, and the sensor units 50 distributedly mounted are connected (electronically connected) through the through-holes $H_T$ on the third rigid board 3.

Therefore, it is possible to manufacture a sensor device I without using a flexible board. This makes it possible to suppress the cost of the board material. Further, it is possible to suppress the assembly cost by omitting the bending step with the flexible board. Consequently, it is possible to suppress the manufacturing cost of the sensor device I.

In addition, since the sensor device I uses a gastric acid battery as the battery 5B, the risk of liquid leakage and the restriction on the size of the sensor device due to a button battery can be eliminated as compared with a case where a button battery is used. Accordingly, such a battery can ensure the safety of the living body and contributes to the reduction in size of the sensor device I.

II. Second Embodiment

[1. Configuration]

Figure 10A:
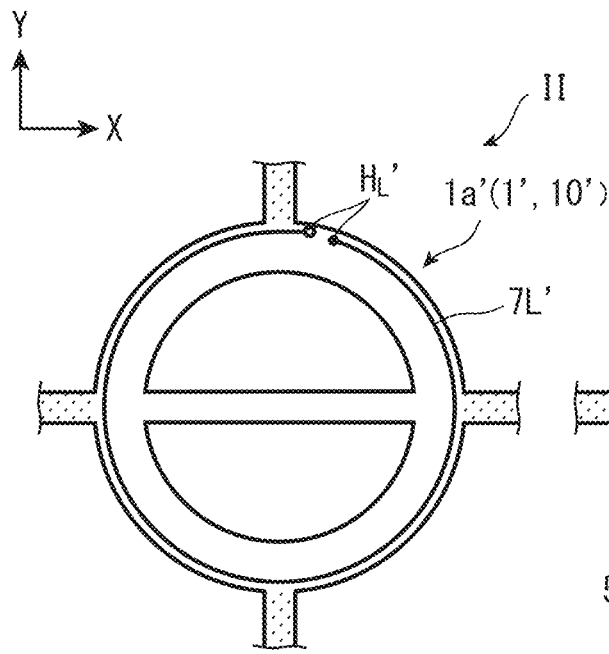
FIG. 10A and FIG. 10B are plan views showing a first rigid board used in a swallowing sensor device of a second embodiment, FIG. 10A showing a front face of the first rigid board, and FIG. 10B showing a back face of the first rigid board.
Figure 10B:
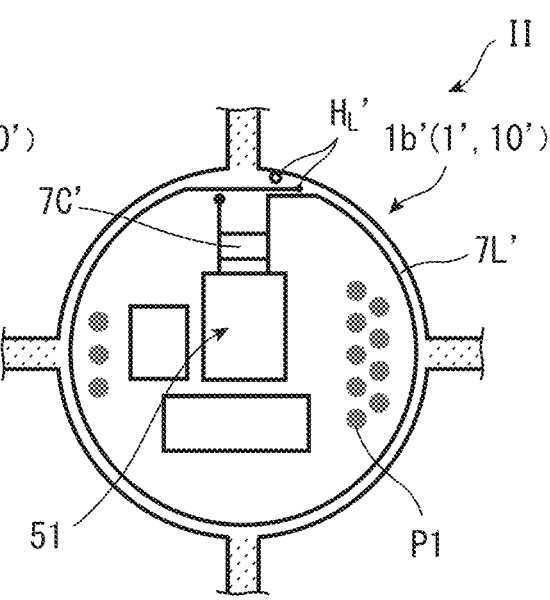

Next, description will now be made in relation to a sensor device II of the second embodiment with reference to FIGS. 10A and FIG. 10B.

The sensor device II of the second embodiment is different from that of the first embodiment in that the transmitting coil 7L' is embedded in board group 10' whereas the transmitting coil 7L is externally attached to the board group 10 in the sensor device I of the first embodiment described above. In contrast to the sensor device I of the first embodiment described above, which mounts the transmitter capacitor 7C on the front face 2a of the second rigid board 2, the present embodiment is different in that the transmitter capacitor 7C' of the present embodiment is mounted on the back face 1b' of the first rigid board 1'. The remaining configurations are the same as the first embodiment, so like reference numbers designate the same elements and parts, and redundant description is omitted here.

The present second embodiment describes an example of a layout in which transmitting coil 7L' is embedded in the first rigid beard 1'. However, the board in which transmitting coil 7L' is embedded is not limited to the first rigid board 1', and may alternatively be the second rigid board or the third rigid board that are not shown in the drawings, or may be all or some thereof.

Around the outer periphery of the first rigid board 1' of the sensor device II, a winding of the transmitting coil 7L' is embedded.

On this first rigid board 1', through-holes $H_L$'(different from the through-holes $H_T$ described above) that electrically connect the front face 1a' to the back face 1b' are drilled at points different from the first sensor unit 51' and the pads P1 in a plan view. Then, the winding of transmitting coil 7L' in the first rigid board 1' makes one turn in the front face 1a' as shown in FIG. 10A and another winding makes another turn in the back face 1b' as shown in FIG. 10B, and the windings on the front face 1a' and the back face 1b' are connected through the through-holes $H_L$'.

In addition, the winding on front face 1a' and the winding on the back face 1b' are wound in patterns that do not overlap in a plan view.

Incidentally, as compared with the first rigid board 1 in sensor device I of the first embodiment, the first rigid board 1' of the sensor device II of the present embodiment has an outer diameter larger by the amount for embedding the transmitting coil 7L' therein.

Figure 11A:
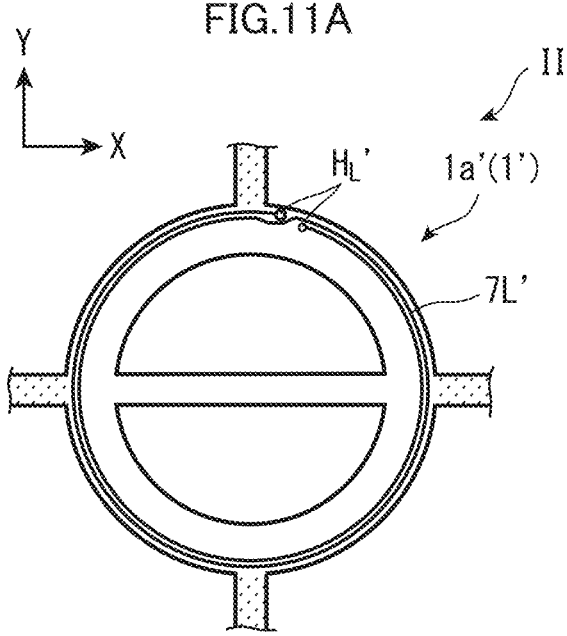
FIG. 11A and FIG. 11B are plan views showing a first rigid board used in a swallowing sensor device of a modification of the second embodiment, FIG. 11A showing a front face of the first rigid board, and FIG. 11B showing a back face of the first rigid board.
Figure 11B:
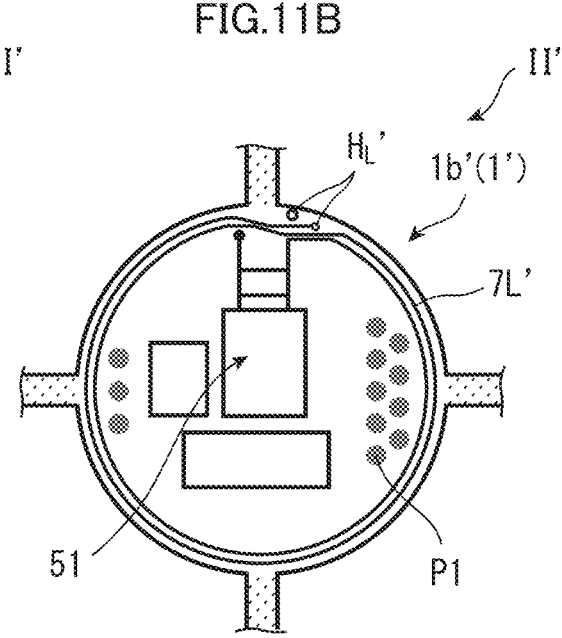

Alternatively, as shown in FIGS. 11A and 11B, the winding of transmitting coil 7L' may make multiple turns in each layer, namely the front face 1a' and the back face 1b' (in the example of FIG. 11, the winding makes two turns). The first rigid board 1' of the sensor device II' in this case can have a larger outer diameter in proportional to an increase of the number of turns on the same layer than the first rigid board 1' of the sensor device II shown in FIG. 10A and FIG. 10B.

[2. Action and Effect]

The sensor device II of the present embodiment, which is configured as described above, can obtain the following actions and effects.

Since the transmitting coil 7L' is embedded in the first rigid board 1', the transmitting coil 7L' can be implemented as well as the first sensor unit 51'. In addition, the transmitting coil 7L' may be embedded when the first rigid board 1' is manufactured. This makes it possible to omit the steps such as post-implementation and external implementation of the transmitting coil 7L as performed in the first embodiment. Therefore, it is possible to reduce the manufacturing cost.

Here, the windings adjacent to each other along the Z-axis direction in the transmitting coil 7L' function as a capacitor. The capacitance of this capacitor is also referred to as "inter-pattern capacitance". In the region of the higher frequency than the predetermined resonant frequency where the inter-pattern capacity becomes dominant over the inductance of the transmitting coil 7L', the transmitting coil 7L' is unable to exert the function as an inductor, so that information is not transmitted to the outside.

In contrast, since the windings of transmitting coil 7L' are wound in respective patterns that do not overlap in a plan view, it is possible to suppress the inter-pattern capacitance, so that the setting region of the resonant frequency can be secured. For example, a higher resonant frequency than that in the sensor device I of the first embodiment can be set.

In addition, a layout in which the windings of the transmitting coil 7L' makes multiple turns in each layer of the front face 1a' and the back face 1b' can ensure the inductance of the embedded transmitting coil 7L'.

III. Third Embodiment

[1. Configuration]

Next, with reference to FIGS. 12A to 12F, a sensor device III of the third embodiment will now be described.

The sensor device III of the third embodiment is different from that of the second embodiment in that the windings of transmitting coil 7L" are arranged in three or more layers whereas the windings of transmitting coil 7L' are arranged in two layers, i.e., the front face 1a' and the back face 1b' in the sensor device II of the second embodiment described above. The remaining configuration is the same as the second embodiment, so repetitious description is omitted here.

In the present embodiment, a layout that embeds the transmitting coil 7L" in the third rigid board 3" is exemplified. However, the board in which the transmitting coil 7L" is embedded is not limited to the third rigid board 3", and may alternatively be the first rigid board or the second rigid board not shown.

The third rigid board 3" of the sensor device III uses a multilayer board (having three or more layers of wiring layer) having a wiring layer in addition to the front face 3a" and the back face 3b". Here, the wiring layers are exemplified by a first layer L1, a second layer L2, a third layer L3, a fourth layer L4, a fifth layer L5, and a sixth layer L6 that are aligned in this sequence in the Z direction. A six-layer board having these layers is an example of the third rigid board 3". Incidentally, the first layer L1 corresponds to the front face 3a" of the third rigid board 3", and the sixth layer L6 corresponds to the back face 3b" of the third rigid board 3".

In the third rigid board 3", the winding of the transmitting coil 7L" is embedded in each of the first layer L1, the second layer L2, the third layer L3, the fourth layer L4, the fifth layer L5, and the sixth layer L6.

On this third rigid board 3", through-holes $H_L$" (different from the through-holes $H_T$ described above) that electrically connects the front face 3a" to the back face 3b" are drilled at points different from the through-holes $H_T$" in a plan view.

Further, through-holes $H_L$" as many (i.e., six) as the number of layers L1-L6 are provided to electrically connect each of the adjacent layers L1-L6 (in this example, a reference number is applied to the through-hole $H_L$" electronically connected in each layer). These through-holes $H_L$" are arranged in the different positions in the radius direction on the third rigid board 3" so that the respective windings of the layers L1-L6 are wound in the patterns not overlapping in a plane view or that the windings of the odd layers L1, L3, and L5 are wound in a pattern not overlapping with the pattern of the winding of the even layers L2, L4, and L6 in a plan view.

Incidentally, parts that connect layers of the first layer L1, the second layer L2, the third layer L3, the fourth layer L4, the fifth layer L5, and the sixth layer L6 that are provided to the third rigid board 3" are not limited to the through hole $H_L$" but alternatively may be non-through-holes, such as IVHs (Inner Via Holes) or BVHs (Blind Via Holes).

As shown in FIG. 12A, the winding of the transmitting coil 7L" in the first layer L1 makes one turn as shown in FIG. 12A. Similarly, in each of the second layer L2 shown in FIG. 12B, the third layer L3 shown in FIG. 12C, the fourth layer LA shown in FIG. 12D, the fifth layer L5 shown in FIG. 12E, and the sixth layer L6 shown in FIG. 12F, the winding of transmitting coil 7L" makes one turn. The windings of two adjacent layers among these layers L1-L6 are connected via the holes $H_L$".

[2. Action and Effect]

The sensor device III of the present embodiment, which is configured as described above, can obtain the following actions and effects Since the windings of the transmitting coil 7L" are wound around the respective layers of the third rigid board 3" in the form of the multilayer board, it is possible to ensure the inductance of the embedded transmitting coil 7L".

In addition, since the windings of the respective layers L1-L6 are arranged so as not to overlap each other in a plan view by multiple through-holes $H_L$" having different radial positions, it is also possible to suppress the inter-pattern capacitance while securing the inductance, so that the setting region of the resonant frequency can be secured.

IV. Fourth Embodiment

[1. Configuration]

Figure 13:
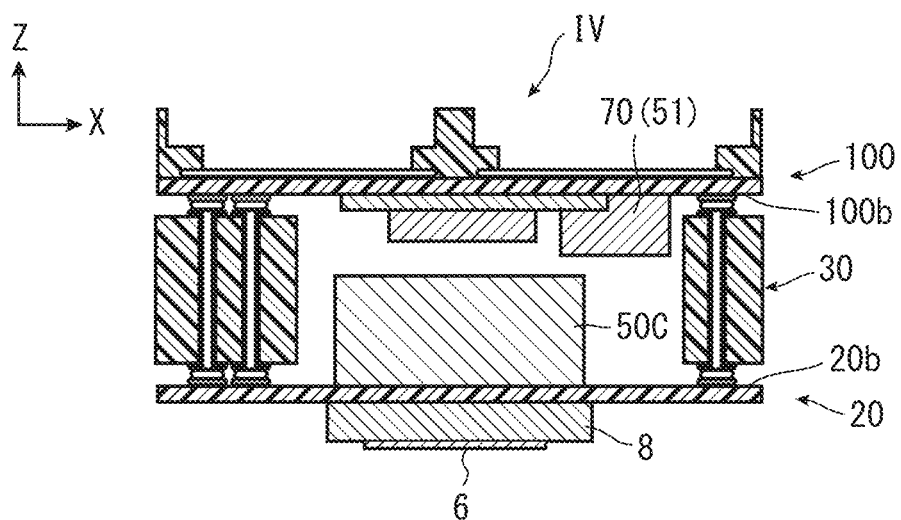
FIG. 13 is a schematic diagram illustrating a main part of a swallowing sensor device of a fourth embodiment.

Next, description will now be made in relation to a sensor device IV of the fourth embodiment with reference to FIG. 13.

The sensor device IV of the fourth embodiment is different from the sensor device I of the first embodiment described above in the following points 1 and 2.

Difference 1: a layout in which the front and back sides of the second rigid board 2 of the first embodiment are inverted Difference 2: using a third rigid board 30 having a dimension in the 2 direction larger than that of the third rigid board 3 of the first embodiment The configuration except for the third rigid board 30 is the same as the first embodiment, so repetitious description is omitted here.

In regard to the above different point 1, the power source capacitor 50C of the present embodiment has a similar holding amount of charged charge to that of the power source capacitor 5C of the first embodiment. With this structure, in cases where a thin third rigid board 3 as used in the first embodiment is used, the power source capacitor 50C mounted on back face 20b of the second rigid board 20 may interfere with the back face 100b or the first sensor unit 51 of the first rigid board 100 as described in the above Difference 1.

As a solution to the above, this embodiment uses a third rigid board 30 thicker than that of the third rigid board 3 of the first embodiment as described in Difference 2.

For this third rigid board 30, a multilayer board is used as in the third embodiment, the windings of the transmitting coil (not shown) are wound around the respective layers. Generally, the number of layers of a multilayer board is set larger as the thickness of board increases. The third rigid board 30 according to such a layer number setting is used. That is, although the third rigid board 30 in which more layers than the third rigid board 3" of the third embodiment are set is incorporated in the sensor device IV, the entire dimension in the Z direction of the sensor device I and that of the sensor device IV are not different. Further, a power source capacitor 50C having a larger holding amount of charged charge than that of the power source capacitor 5C of the first embodiment may be used.

Figure 14:
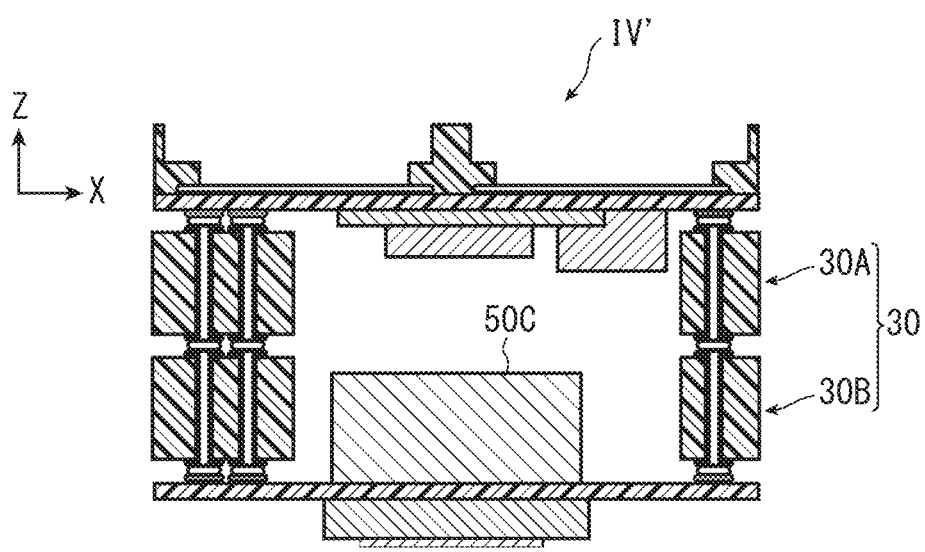
FIG. 14 is a schematic diagram illustrating a main part of a swallowing sensor device of a modification to the fourth embodiment.

In addition, as shown in FIG. 14, the third rigid board 30 of a sensor device IV may be composed of multiple standardized boards 30A and 30B.

For example, a standardized board may be used as the third rigid board 3" in the sensor device III of the third embodiment, and the boards 30A and 30B that are the same as the standardized beard may be stacked to serve as the third rigid board 30 of the present embodiment.

[2. Action and Effect]

The sensor device IV of the present embodiment, which is configured as described above, can obtain the following actions and effects.

Since the winding of the transmitting coil is wound around each layer of the third rigid board 30 in which more layers than those of the third rigid board 3" of the third embodiment are set without changing the overall dimension of the Z direction of the sensor device IV from the sensor device I, it is possible to increase the inductance. Further, in cases where the power source capacitor 50C having a larger holding amount of charged charge than that of the power source capacitor 5C of the first embodiment is used, it is possible to increase the detection frequency or the number of times of detection by the sensor device IV, which can increase the output frequency or the number of times of output of the detected information.

In addition, in cases where the third rigid board 30 consists of multiple standardized boards 30A and 30B, the sensor device III of the third embodiment and the sensor device IV of the present embodiment can eliminate the requirement for preparing each of the third rigid boards 30. Thus, by using the boards 30A and 30B also as the third rigid board 3", it is possible to use common parts both in the sensor devices III and IV. This makes it possible to suppress manufacturing costs of the sensor devices III and IV different in type.

V. Fifth Embodiment

[1. Configuration]

Figure 15:
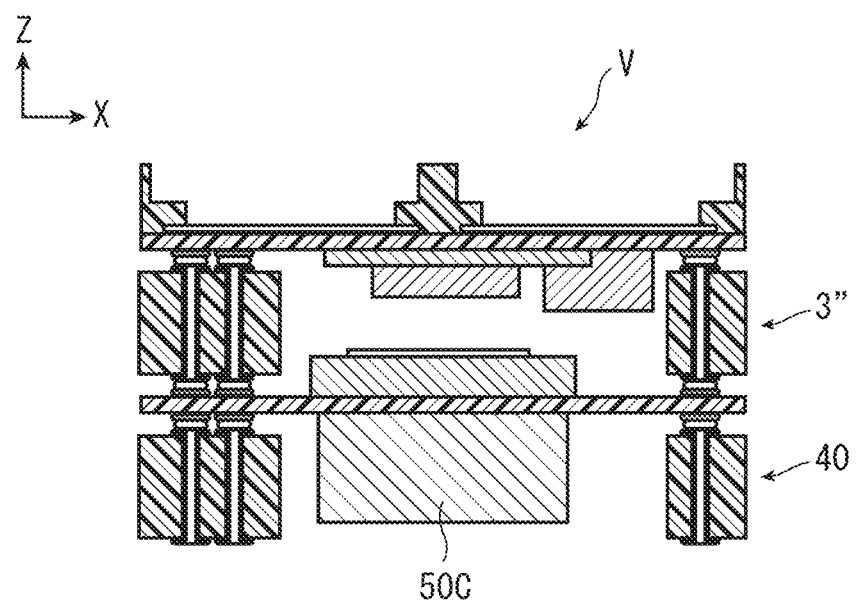
FIG. 15 is a schematic diagram illustrating a main part of a swallowing sensor device of a fifth embodiment.

Next, description will now be made in relation to a sensor device V of the fifth embodiment with reference to FIG. 15.

The sensor device V of the fifth embodiment is different from the sensor device I of the first embodiment described above in the following point.

Difference: a fourth rigid board 40 which is added on the opposite side to the third rigid board 3" with respect to the second rigid board Furthermore, likewise the third rigid board 3", a multilayer board is used as the fourth rigid board 40, and the windings of transmitting coil not shown are wound in each layer. Such windings are connected to transmitting coil embedded in the third rigid board 3". This means that the transmitting coil is embedded distributedly in the third rigid board 3" and the fourth rigid board 40.

Moreover, the third rigid board 3" and the fourth rigid board 40 are the same standard products. That is, the standardized boards 3", 40 are used in the sensor device V.

The remaining configurations are the came as the first and the third embodiments, so redundant description is omitted here.

[2. Action and Effect]

The sensor device V of the present embodiment, which is configured as described above, brings the following actions and effects.

Since the transmitting coil is embedded in the fourth rigid board 40 in addition to the third rigid board 3", it is possible to increase the inductance as compared with sensor device III of the third embodiment.

In addition, since the standardized boards 3" and 40 are used, it is possible to use common parts both in the sensor devices III and V. This makes it possible to suppress manufacturing costs of the sensor devices III and V different in type.

VI. Sixth Embodiment

[1. Configuration]

Next, description will now be made in relation to a method of manufacturing a sensor device VI according to a sixth embodiment with reference to FIG. 16A to FIG. 16D.

The sensor device VI, which is manufactured in this method has the same configuration as sensor device I of the first embodiment described above, but a masking member 80 is used in the manufacturing process. Therefore, in the description of the present embodiment, like reference numbers designate the same parts and elements as the sensor device I of the first embodiment, so repetitious description is omitted here.

The method of manufacturing of the present embodiment is mainly different in postprocessing step from the method of manufacturing the sensor device I of the first embodiment described above.

Specifically, in place of the Steps C1 and C2 (postprocessing step C) of the first embodiment, the following Steps D1, D2, D3, and D4 (postprocessing step D) are performed sequentially in the method for manufacturing of the present embodiment. These step D1, D2, D3, and D4 are different in a scheme that a region (hereinafter, referred to as "exposed region") R at which the electrodes E1 and E2 of the final product of the sensor device VI are not immersed in the bioadaptabie resin from the scheme of Steps C1 and C2.

Step D1: a masking step of masking the exposed region R with masking member 80

Step D2: an immersing and curing step of curing an internal module M by immersing the module M in resin Step D3: a shaping step of adjusting the outer shape Step D4: a releasing step of releasing the masking In addition, the method of manufacturing of the present embodiment is different from the first embodiment in that the structure corresponding to the external wall WE (see FIG. 3) formed in the first implementing step of the preprocessing step of the first embodiment is formed in the above Steps D2, D3, and D4 in the present embodiment. In Steps D1, D2, D3, and D4 of the present embodiment, forming of the partition wall W (see FIG. 3) is omitted.

<Masking Step>

Figure 16A:
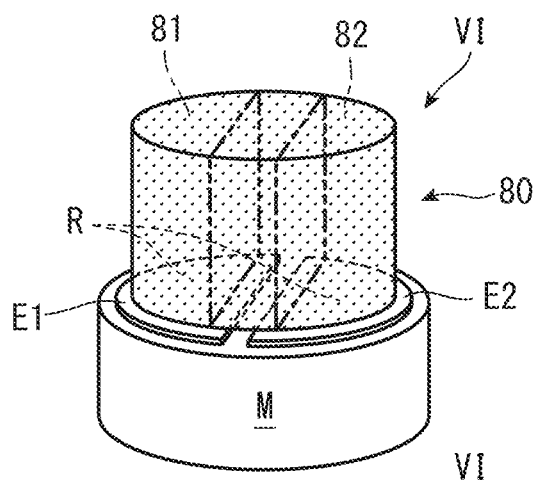
FIG. 16A, FIG. 16B, FIG. 16C and FIG. 16D are diagrams illustrating a postprocessing step of a method of manufacturing a swallowing sensor device of the sixth embodiment, FIG. 16A showing a masking step, FIG. 16B showing a immersing and curing step, FIG. 16C showing a shaping step, and FIG. 16D showing a releasing step.

In the masking step of Step D1, as shown in FIG. 16A, the exposed region R is masked using a masking member 80 shaped according to the exposed region R. The masking member 80 is set to have a dimension in the Z direction larger than that of the external wall WE described above in the first embodiment. This masking member 80 is formed of a soluble material having a property of dissolving by a solvent. Here, the masking member 80 is exemplified by a cylindrical member.

In this masking step, the masking member 80 is laminated and affixed to the exposed region R. In this way, the exposed region R is covered with and masked by a masking member 80 so that the exposed region R is not immersed in the bioadaptable resin.

<Immersing and Curing Step>

Figure 16B:
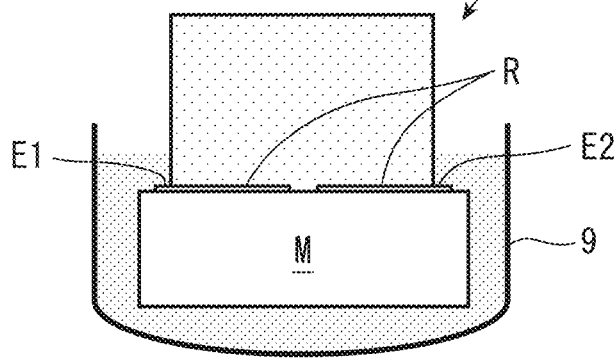

In the immersing and curing step of Step D2, as shown in FIG. 16B, the internal module M consisting of the rigid boards 1, 2, and 3 and the sensor unit 50 (ace FIG. 3) is sank and immersed in the bioadaptable resin filled inside the capsule 9. That is, internal module M is embedded in the bioadaptable resin. Then, the bioadaptable resin is cured. Alternatively, the process waits until the bioadatable resin cures.

Since the exposed region R is masked by the masking member 80 having a dimension in the Z direction larger than the external wall WE (see FIG. 3), the allowable range of position in the Z direction for holding the internal module in this immersing and curing step is wider than the allowable range of the position in the Z direction for holding the internal module M in Step C1 described above.

<Shaping Step>

Figure 16C:
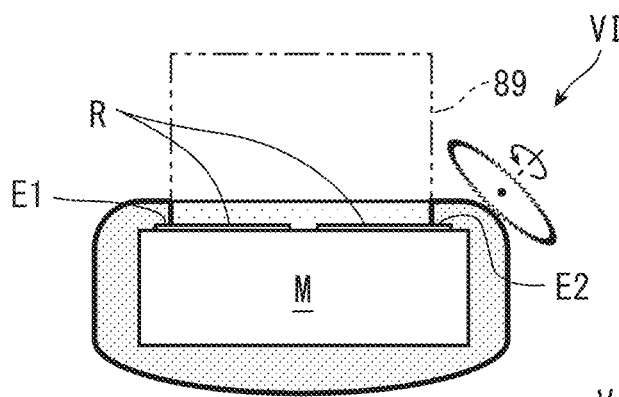

In the shaping step of Step D3, as shown in FIG. 16C, the outer shape is adjusted by rounding the corners of the overall portion and deleting a protruding portion 89 (indicated by a two-dot chain line) of the masking member 80. From this fact, it can be said that the shaping step is a shape adjusting step.

Before the releasing step to be described next and after the shaping step, the exposed region R is not yet exposed and still in a state of being masked.

<Releasing Step>

Figure 16D:
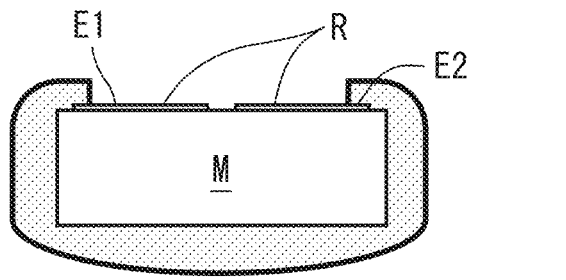

In the releasing step of Step D4, as shown in FIG. 16D, the masking is released by removing the masking member 80. Here, by dissolving the masking member 80 with a solvent, the exposed region R which has been temporarily protected by the masking member 80 is exposed, and masking of exposed region R is released.

After this releasing step, a portion formed of the cured bioadaptable resin appears on the outer peripheral edge of the region where the masking member 80 was present and the portion serves as the configuration corresponding to the external wall WE of the sensor device I of the first embodiment.

[2. Action and Effect]

The method of manufacturing the sensor device VI of the present embodiment, which is configured as described above, can obtain the following actions and effects.

Since the exposed region R is masked by the masking member 30 in the masking step prior to the immersing and curing step, the allowable range of the position in the Z direction for holding the internal module M in this immersing and curing step can be enlarged with ease.

Since the masking member 80 is dissolved in a solvent in the releasing step, masking of exposed region R by the masking member 80 can be easily released.

Since a portion formed of the cured bioadaptable resin, serving as the structure corresponding to the external wall WE, appears after the releasing step, a step of forming the external wall WE in the first implementing step of the first embodiment can be omitted.

By simplifying and facilitating the producing step as the above, it is possible to reduce the manufacturing cost of the sensor device VI.

[3. Modification]

Next, description will now be made in relation to a modification of the method of manufacturing a sensor device of the sixth embodiment.

In the manufacturing method of the sensor device according to the sixth embodiment described above and the manufacturing method of the modification described below, the immersing and curing step is satisfactorily carried out at least after the electrically connecting step and the masking step is satisfactorily carried out at least prior to the immersing and curing step.

For example, a masking step may be performed during the preprocessing step or the intermediate processing step. Likewise the above alternatives, the immersing and curing step may be performed later than the masking step performed before the postprocessing step. Incidentally, if the shaping of the rigid board is not required or the transmitting coil is embedded in the rigid board, the intermediate processing step can be omitted.

In the following description, modifications using a soluble masking member is exemplified by a first modification a second modification, and a third modification. In these modifications, similarly to the method of manufacturing the sensor device VI of the sixth embodiment, masking is achieved by covering the exposed region.

In addition, as a modification of masking by surrounding the periphery of the exposed region is exemplified by a fourth modification and a fifth modification These modifications do not have to form the masking member of a soluble material, and do use a masking member formed of an insoluble material. The fourth and the fifth modifications do not require the releasing step of releasing the masking of the aforementioned Step D4.

Apart from the points described here, the remaining configurations are the same as the above sixth embodiment. Like reference numbers designate the same elements and parts, and redundant description is omitted here.

[3-1. First Modification]

In the first modification, as shown by a two-dot chain line in FIG. 16A, two masking members 81 and 82 are used. Specifically, the first masking member 81 corresponding to the electrode E1 and the second masking member 82 corresponding to the electrode E2 are used. These masking members 81 and 82 are spaced from each other with a space corresponding to partition wall W of the censor device I of the first embodiment.

By using the above masking members 81 and 82, a portion, serving as a configuration corresponding to partition wall w, can be formed of the cured bioadaptabie resin between masking members 81 and 82.

[3-2. Second Modification]

The second modification uses a masking member formed of the masking members 81 and 82 of the first modification connected to each other but spaced apart with a space corresponding to at least the partitioning wail w. For example, this modification uses a portal-shaped masking member (i.e., columns tops of which are connected to each other) for the electrodes E1 and E2.

Using an integral masking member as described above contributes to simplification of the producing step of the sensor device.

[3-3. Third Modification]

The third modification uses a masking member formed of a soluble material that can be dissolved by a body fluid. In cases where this masking member is used, the masking member dissolves when the sensor device is taken and comes into contacted with and immersed in a body fluids. Therefore, it is possible to omit the releasing step, which contributes to simplification of the producing step of the sensor device.

Incidentally, if part of the masking member of the present modification is in the state of protruding after the immersing and curing step, the protruding part is removed in the shaping step in order to increase the safety.

[3-4. Fourth Modification]

The fourth modification uses a masking member having a shape surrounding the exposed region (i.e., shape corresponding to the exposed region). Here, a cylindrical member is exemplified as a masking member.

In this modification, since the masking member does not cover the exposed region, so the releasing step of the masking member can be omitted. In addition, this embodiment, which does not release the masking member, preferably forms the masking member with a bioadaptable resin.

The masking member of the present modification is, in the masking step, laminated and affixed to the internal module in such an arrangement that the masking member forms a peripheral wall surrounding the exposed region. This masking member has a dimension in the Z direction set larger than the external wall WE (see FIG. 3) described above in the first embodiment.

In the shaping step, the outer shape is adjusted by rounding the corners of the overall portion and deleting a protruding portion of the masking member. After this shaping step, part of the masking member appears to serve as a configuration corresponding to the external wall WE.

The masking member of the present modification, which can mask the exposed region by surrounding the exposed region and therefore omit the releasing step, contributes to simplification of the method of manufacturing the sensor device.

[3-5. Fifth Modification]

The above fourth modification, which uses the cylindrical member as the masking member, can be applied to the configuration corresponding to the external wail WE (see FIG. 3), but is not applied to the configuration corresponding to the partition wail W (see FIG. 3).

Considering the above point, the fifth modification uses a masking member having shapes conform to the partition wall W as well as the external wall WE. Specifically, this modification uses a masking member in the cylindrical form of the fifth modification that additionally has a wall portion extending in the diametrical direction and also extending in the Z direction.

The masking member of the present modification can form a structure corresponding to the partition wail W in addition to the operation and effects of the fifth modification.

VII. Miscellaneous

Each configuration of the above embodiments can be variously modified and implemented without departing from the scope thereof. Also, the configuration can be selected or omitted according to the requirement or appropriately combined.

For example, each of the rigid boards that constitute the board group is not limited to a layout in which a single rigid board is placed for a single base material.

Figure 17:
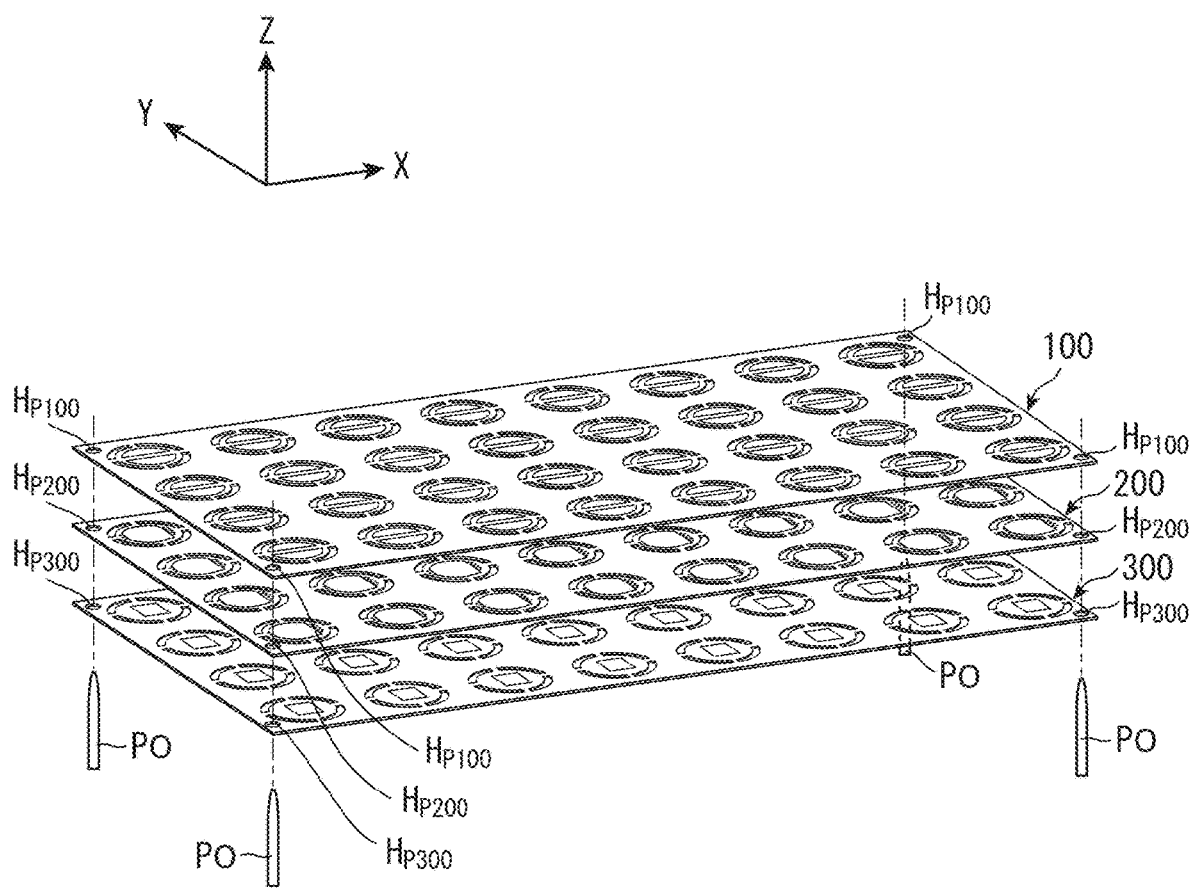
FIG. 17 is a perspective view illustrating an exemplary process of manufacturing a swallowing sensor device.

Alternatively, as shown in FIG. 17, multiple rigid boards may be arranged for each of the base material 100, 200, and 300. By using a base material having a layout that multiple rigid boards are arranged thereon, the stacking step required for each sensor device can be carried out collectively as compared with a layout that arranges a single rigid board on a single base material. In addition, the position of the base materials 100, 200, and 300 can be determined simply by inserting the positioning pins PO into positioning holes $H_{P100}$, $H_{P200}$, and $H_{P300}$. Therefore, it is possible to manufacture multiple sensor devices at a time. Therefore, it is possible to further suppress the manufacturing cost.

Alternatively, the board group may consist of at least two boards. That is, one board in which one part of a sensor unit is mounted and the other board in which the other part of the sensor unit is mounted may constitute the board group, and the one part and the other part of the sensor unit may be electrically connected in the stacking direction (the Z direction described above) of the board group.

For example, the coil (the other part) may be embedded in the other board, and other sensors (one part) may be embedded in the one board. In this case, the coil on the other board and the sensors the one part of the sensor unit on the one board are electrically connected by interposing a known material such as a anisotropic conductive film or an solder described above between the respective pads provided on the one and the other boards. Specifically, this case may use a sensor device in which the second sensor unit 52 is mounted on the first rigid board 1 (one board) in addition to the first sensor unit 51, the second rigid board 2 is omitted, and the transmission coils 7' and 7" shown in FIGS. 10-13 are mounted on the third rigid board 3 (the another board) with respect to the sensor device I shown in FIG. 3.

According to the swallowing sensor device that has a structure in which the second rigid board is omitted; and the first rigid board (one board) on which one part of the sensor unit is mounted and the third rigid board (the other board) or the fourth board (the other board) on which the other part of the sensor unit is mounted are electrically connected in the stacking direction, it is possible to reduce the number of overall parts and therefore to reduce the size. The sensor device has a simple structure and obtains the above actions and effects.

The transmitting coil is satisfactorily wound on at least one or more layers or two or more layers. For example, a transmitting coil may be wound on at least one of front face and back face of each rigid board. Further, in the rigid board of the multilayer board, it is sufficient that the transmitting coil is wound on at least one of the front face, the back face, and the other inner layers.

In addition, the sensor device is not limited to the application of being swallowed by the subject, but may alternatively applied to being circulated through the inside of the pipes of the plant or its mechanical equipment. In addition to the digestive systems or pipes, the sensor device has possibility to be applied to various locations where detection has conventionally been difficult to be accomplished.

All examples and conditional language provided herein are intended for pedagogical purposes to aiding the reader in understanding the disclosure and the concepts contributed by the inventor to further the art, and are not to be construed as limitations to such specifically recited examples and conditions, nor does the organization of such examples in the specification relate to a showing of the superiority and inferiority of the disclosure. Although one or more embodiment(s) of the present disclosure have been described in detail, it should be understood that the various changes, substitutions, and alterations could be made hereto without departing from the spirit and scope of the disclosure.

What is claimed is:
1. A swallowing sensor device comprising:
  a sensor unit that includes a sensor and a device configured to wirelessly transmit information detected by the sensor;
  a battery configured to generate electric power between two electrodes, each having an upper surface contactable with a body fluid, and
  a board group formed by stacking a plurality of rigid boards, wherein
  the board group includes
    a first rigid board on which one part of the sensor unit is mounted;
    a second rigid board on which other part of the sensor unit except for the one part of the sensor unit is mounted; and a third rigid board being disposed between the first rigid board and the second rigid board and comprising a through-hole drilled thereon, the through-hole being configured to electrically connect the one part and the other part of the sensor unit, wherein the first rigid board is arranged such that a front face thereof is exposed to the body fluid, the battery is mounted on the front face a partition wall is provided between the two electrodes, and the partition wall is provided so as to protrude from a surface provided with the two electrodes to a height exceeding the upper surfaces of the electrodes.

2. The swallowing sensor device according to claim 1, wherein the device comprises a communication coil embedded in the plurality of rigid boards.

3. The swallowing sensor device according to claim 2, wherein the communication coil is embedded in a front face and a back face of the board group.

4. The swallowing sensor device according to claim 2, wherein the communication coil is wound in a pattern that winding on a front face and winding on a back face do not overlap as seen from a direction of stacking the board group.

5. The swallowing sensor device according to claim 2, wherein the communication coil is wound in a pattern not overlapping at all as seen from a direction of stacking the board group.

6. The swallowing sensor device according to claim 2, wherein the third rigid board is a multilayer board having a plurality of layers, and the communication coil is embedded in the plurality of layers.

7. The swallowing sensor device according to claim 1, wherein the board group further comprises a fourth rigid board stacked on an opposite side to the third rigid board with respect to the first rigid board or the second rigid board.

8. The swallowing sensor device according to claim 1, wherein the sensor unit and the board group are covered by a capsule and the two electrodes are exposed.

9. The swallowing sensor device according to claim 1, wherein the inner faces of the through-hole formed by drilling is plated with conductor.

10. The swallowing sensor device according to claim 1, wherein the partition wall is provided so as to rise over an entire length of sides of the two electrodes, the sides facing each other.

11. The swallowing sensor device according to claim 1, wherein the first rigid board comprises an external wall, edge portions of the two electrodes, the edge portions facing each other, are covered with the partition wall and edge portions of the two electrodes except for the edge portions facing each other are covered with the external wall.

12. A method of manufacturing a swallowing sensor device, the method comprising:

stacking a first rigid board on which one part of a sensor unit comprising a sensor and a device configured to wirelessly transmit information detected by the sensor and a battery configured to generate electric power between two electrodes, each having an upper surface contactable with a body fluid are mounted, a second rigid board on which other part of the sensor unit except for the one part of the sensor unit is mounted, and a third rigid board comprising a through-hole drilled thereon for electrically connecting the one part and the other part such that the third rigid board is arranged between the first rigid board and the second rigid board; and electrically connecting the one part mounted on the first rigid board and the other part mounted on the second rigid board stacked in the stacking through the through-hole of the third rigid board, wherein the first rigid board is arranged such that a front face thereof is exposed to the body fluid, the battery is mounted on the front face a partition wall is provided between the two electrodes, and the partition wall is provided so as to protrude from a surface provided with the two electrodes to a height exceeding the upper surfaces of the electrodes.

13. The method of manufacturing a swallowing sensor device according to claim 12, the method further comprising:

immersing and curing which being executed after the electrically connecting, the immersing includes immersing an internal module comprising the first rigid board, the second rigid board, the third rigid board, and the sensor unit in resin filled in a capsule and the curing includes curing the resin; and masking which being executed before the immersing and curing, the masking includes arranging a member having a shape corresponding to a region and masking the region so that the region is not immersed in the resin, the region at which two electrodes being included in the device and generating electric power when being in contact with a body fluid are exposed.

14. A swallowing sensor device comprising:

a sensor unit that includes a sensor and a device configured to wirelessly transmit information detected by the sensor;

a battery configured to generate electric power between two electrodes, each having an upper surface contactable with a body fluid, and a board group formed by stacking a plurality of rigid boards, wherein the board group includes:

a first rigid board on which one part of the sensor unit is mounted;

a second rigid board on which other part of the sensor unit except for the one part of the sensor unit is mounted; and a third rigid board being disposed between the first rigid board and the second rigid board and comprising a through-hole drilled thereon, the through-hole being configured to electrically connect the one part and the other part of the sensor unit, wherein the first rigid board is arranged such that a front face thereof is exposed to the body fluid, the battery is mounted on the front face, a partition wall is provided so as to rise over an entire length of sides of the two electrodes, the sides facing each other, and the partition wall is provided so as to protrude from a surface provided with the two electrodes to a height exceeding the upper surfaces of the electrodes, the first rigid board further comprises an external wall, edge portions of the two electrodes, the edge portions facing each other, are covered with the partition wall and edge portions of the two electrodes except for the edge portions facing each other are covered with the external wall.

\* \* \* \* \*